United States Patent
Nakamura et al.

(10) Patent No.: US 6,735,511 B2
(45) Date of Patent: May 11, 2004

(54) BRAKE CONTROL SYSTEM FOR VEHICLE

(75) Inventors: Hideo Nakamura, Yokohama (JP);
Junji Tsutsumi, Kanagawa (JP);
Kazuhiko Tazoe, Kanagawa (JP);
Yutaka Kaneko, Kanagawa (JP);
Hiroyuki Ashizawa, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 10/342,341

(22) Filed: Jan. 15, 2003

(65) Prior Publication Data

US 2003/0182044 A1 Sep. 25, 2003

(30) Foreign Application Priority Data

Jan. 15, 2002 (JP) .................................. 2002-006496
Jul. 30, 2002 (JP) .................................. 2002-221990
Sep. 25, 2002 (JP) .................................. 2002-279317

(51) Int. Cl.[7] .................................................. G06G 7/76
(52) U.S. Cl. ........................... 701/70; 701/83; 701/84; 180/65.8; 303/124; 303/152
(58) Field of Search ......................... 701/70, 73, 80, 701/83, 84; 180/65.2, 65.3, 65.4, 65.8, 165; 303/15, 124, 152

(56) References Cited

U.S. PATENT DOCUMENTS 3,657,625 A    4/1972  Miller et al.
3,829,167 A    8/1974  Rouf et al.
3,887,239 A  * 6/1975  Engle .......................... 303/128
6,089,679 A    7/2000  Kushi et al.
6,231,134 B1 * 5/2001  Fukasawa et al. .......... 303/152
6,508,523 B2 * 1/2003  Yoshino ...................... 303/152
2001/0024104 A1  9/2001  Suzuki

FOREIGN PATENT DOCUMENTS

EP    1 160 119 A1   12/2001
JP      56-33254 B2   8/1981
JP      7-223532 A    8/1995
JP    2000-264184 A   9/2000
JP    2001-268719 A   8/2001

OTHER PUBLICATIONS

Patent Abstracts of Japan, vol. 1995, No. 4, JP 07–007806, Jan. 10, 1995.

* cited by examiner

Primary Examiner—Gertrude A. Jeanglaude
(74) Attorney, Agent, or Firm—Foley & Lardner LLP

(57) ABSTRACT

A brake control system for a vehicle is comprised of a first braking device that generates a braking torque by operating a driving source of the vehicle and a second braking device that generates the braking torque by operating a hydraulic brake system of the vehicle. A controller of the brake control system is arranged to calculate a desired braking torque according to a driver's demand, to divide the desired braking torque into a low-frequency component and a high-frequency component, to command the first braking device to generate the high-frequency component, and to command at least one of the first braking device and the second braking device to generate the low-frequency component.

18 Claims, 25 Drawing Sheets

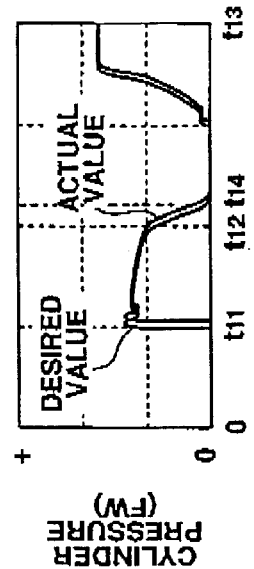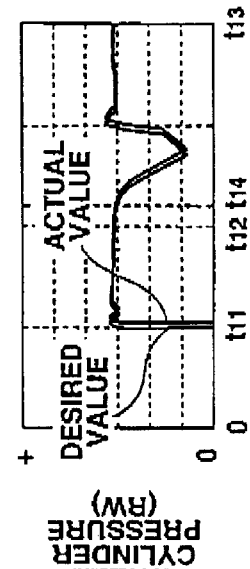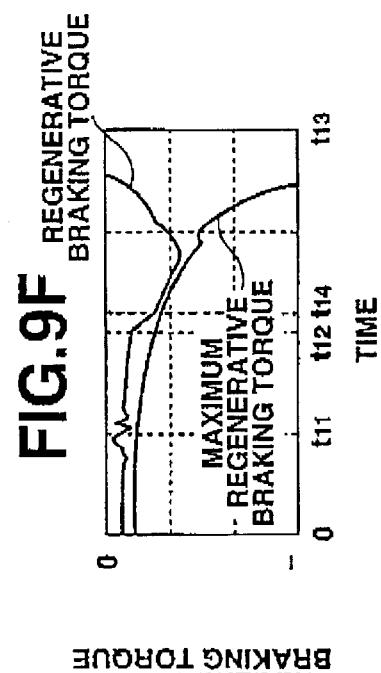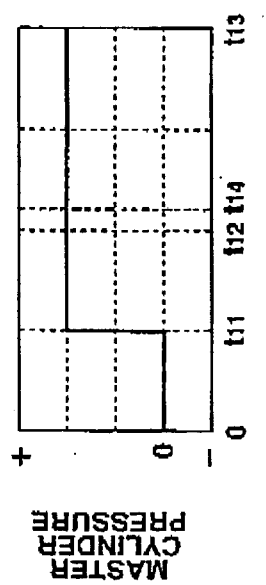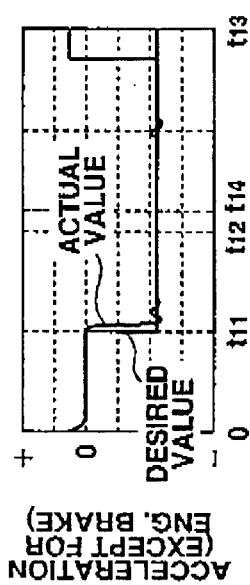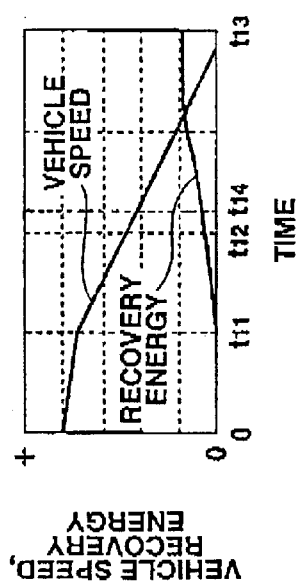

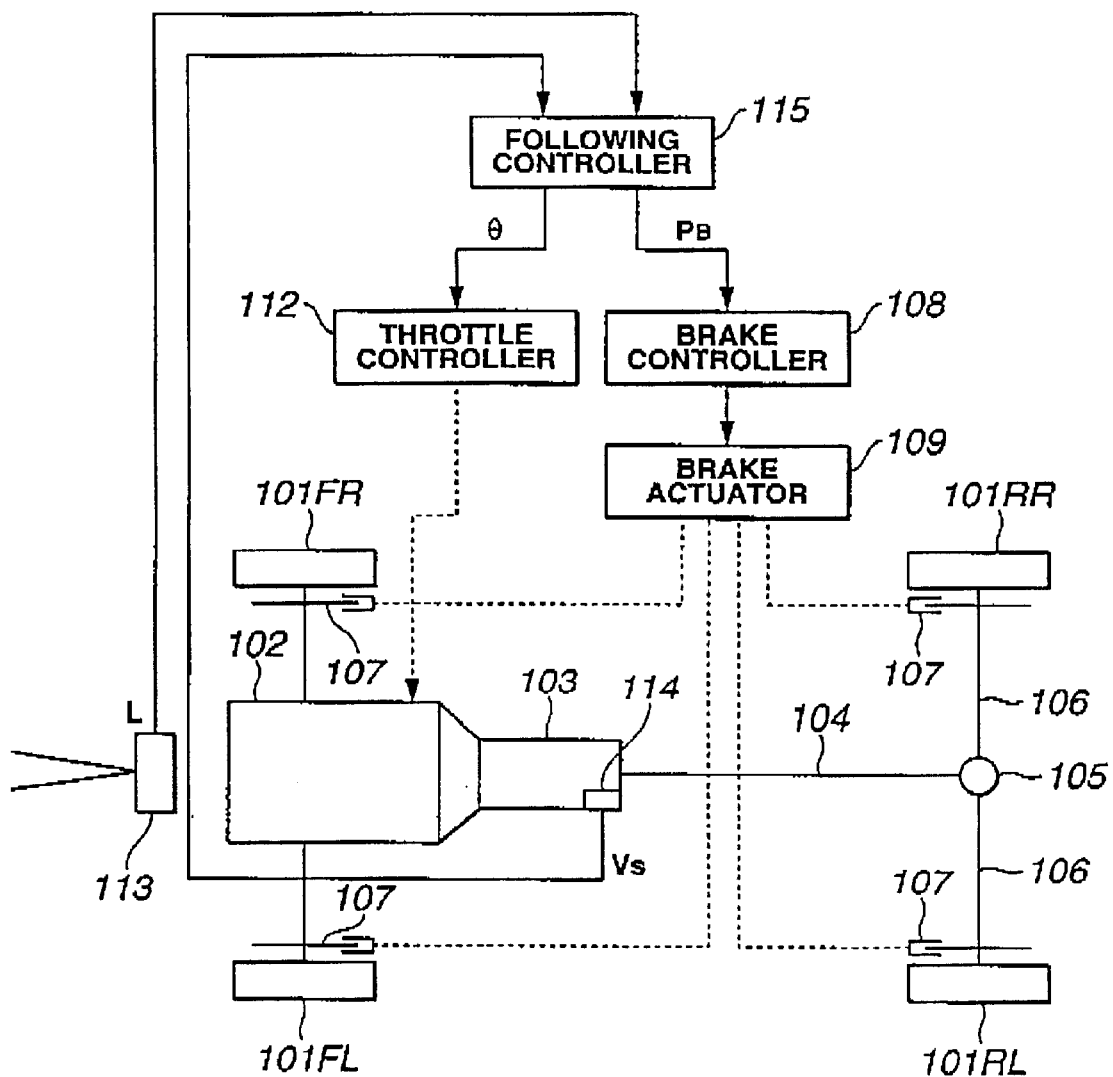

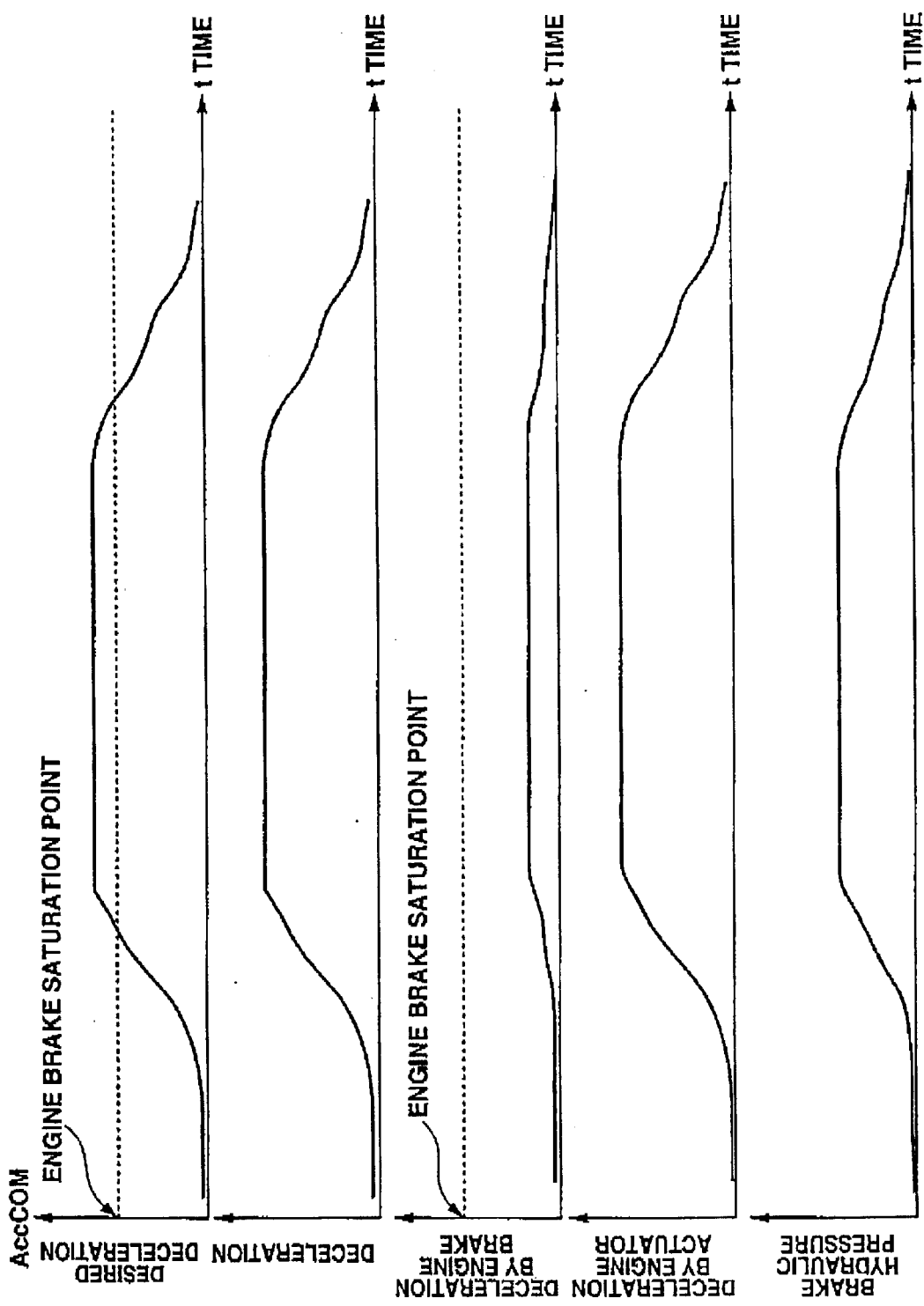

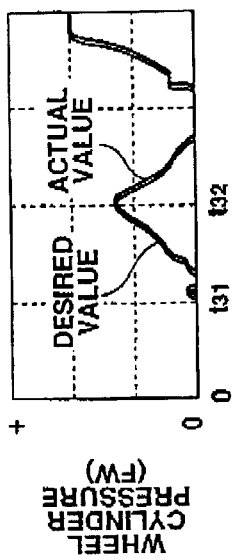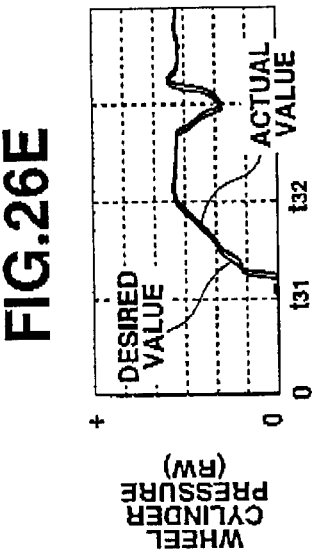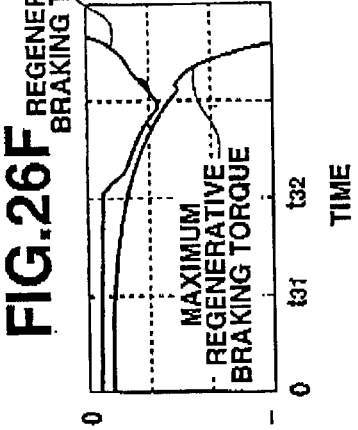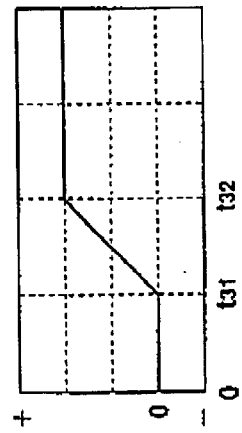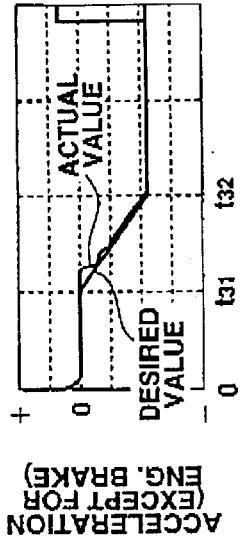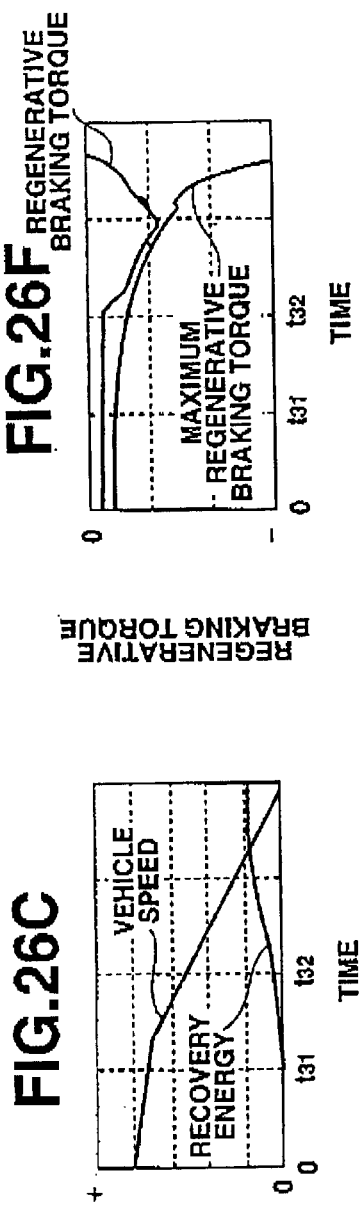

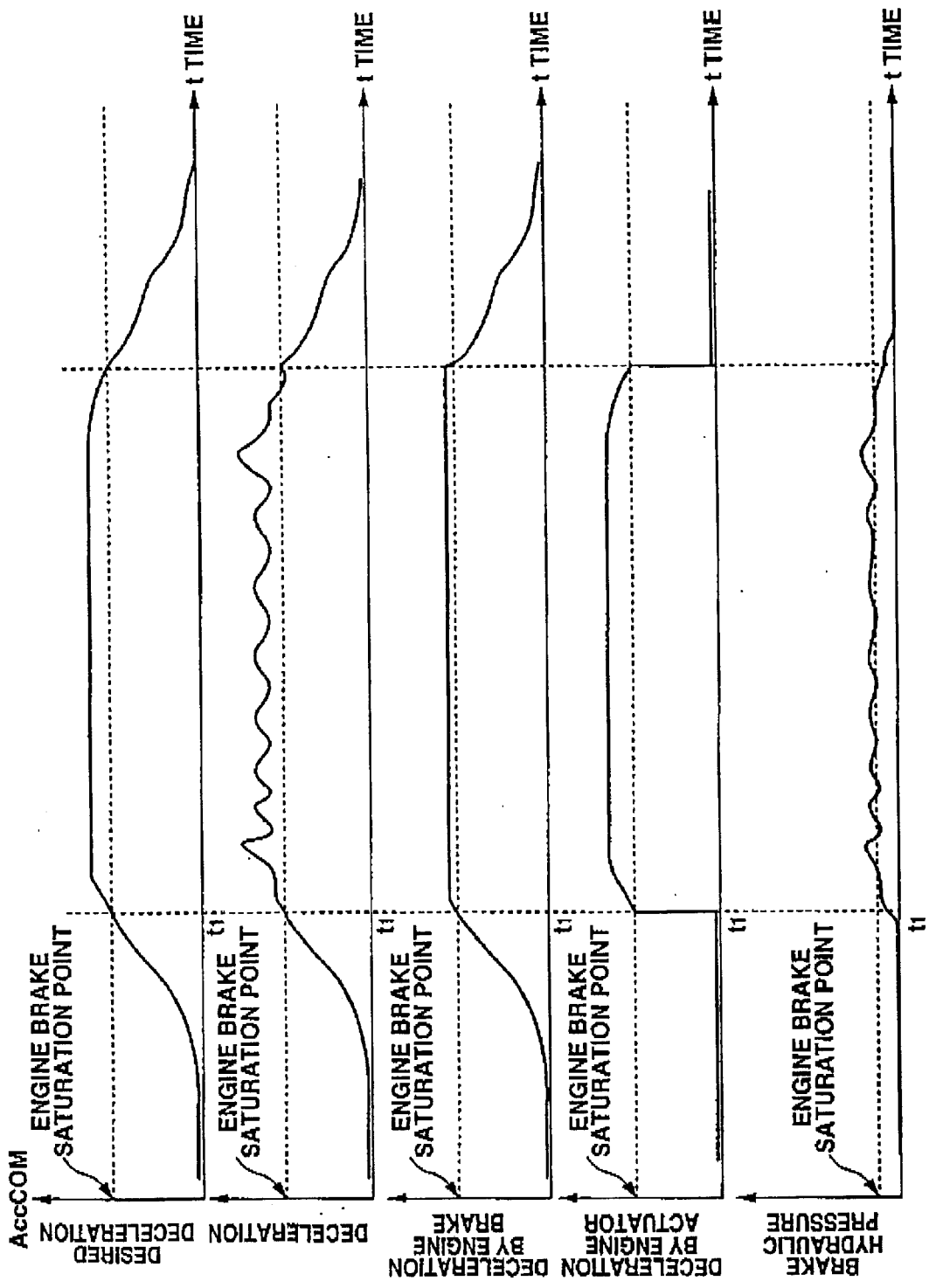

BRAKE CONTROL SYSTEM FOR VEHICLE

BACKGROUND OF THE INVENTION

The present invention relates to a brake control system, which generates braking torque by controlling a driving source of a vehicle and a hydraulic brake system.

Japanese Patent Provisional Publication No. 7-223532 discloses a brake control system, which controls a regenerative brake system and a hydraulic brake system according to a demanded braking torque calculated according to a depression degree of a brake pedal.

Further, Japanese Patent Publication No. 56-33254 discloses a brake control system, which controls a hydraulic brake system by feeding back a difference between an actual deceleration and a driver's demand deceleration.

SUMMARY OF THE INVENTION

On the assumption that these two techniques are combined, when a desired deceleration is calculated by adding a feedback compensation quantity obtained from an actual deceleration and a deceleration according to the driver's demand, when both of a hydraulic brake system and a regenerative brake system are controlled to achieve the desired deceleration and when it is intended to improve a fuel consumption, regenerative braking is executed prior to hydraulic braking.

However, the feedback compensation quantity as to the deceleration has a frequency higher than that of the deceleration according to the driver's demand. Accordingly, if the regenerative brake system generates a maximum braking torque in reply to the deceleration according to the driver's demand, the feedback compensation quantity tends to be generated by the hydraulic brake system. Since the hydraulic brake system is lower in responsibility and resolution than the regenerative brake system, there is a possibility that this brake control system performs an insufficient responsibility in generating the feedback compensation quantity and thereby degrading the following performance relative to the deceleration according to the driver's demand.

It is therefore an object of the present invention to provide a brake control system which improves a controllability including a following performance to a driver's deceleration demand.

An aspect of the present invention resides in a brake control system for a vehicle equipped with a hydraulic brake device and a driving source for driving the vehicle, the brake control comprises a controller configured to divide a desired braking torque into a low-frequency component and a high-frequency component, to command the driving source to generate the high-frequency component, and to command at least one of the hydraulic brake device and the driving source to generate the low-frequency component.

Another aspect of the present invention resides in a brake control system for a vehicle which comprises a first braking device that generates a braking torque by operating a driving source of the vehicle, a second braking device that generates the braking torque by operating a hydraulic brake system of the vehicle, and a controller connected to the first braking device and a second braking device. The controller is configured to calculate a desired braking torque, to divide the desired braking torque into a low-frequency component and a high-frequency component, to command the first braking device to generate the high-frequency component, to command at least one of the first braking device and the second braking device to generate the low-frequency component.

A further another aspect of the present invention resides in a method of controlling a brake control system for a vehicle equipped with a hydraulic brake device and a driving source for driving the vehicle. The brake control comprises a step for dividing a desired braking torque into a low-frequency component and a high-frequency component, a step for distributing the high-frequency component to the driving source to generate a braking torque corresponding to the high-frequency component, and a step for distributing the low-frequency component to at least one of the hydraulic pressure brake device and the driving source to generating a braking torque corresponding to the low-frequency component.

The other objects and features of this invention will become understood from the following description with reference to the accompanying drawings.

BRIEF DESCRIPTION OF THE DRAWINGS

FIGS. 9A through 9F are graphs employed for explaining operations of the brake control system of the second embodiment according to the present invention.

FIG. 15 is a schematic view showing the brake control system of a fifth embodiment according to the present invention.

FIGS. 22A through 22E are graphs employed for explaining operations of the brake control system of a fifth embodiment according to the present invention.

FIGS. 26A through 26F are graphs employed for explaining operations of the brake control system wherein a transient state distribution ratio is set at a constant value.

FIGS. 27A through 27E are graphs employed for explaining operations of the brake control system of an earlier technology.

DETAILED DESCRIPTION OF THE INVENTION

Hereinafter, there will be discussed embodiments according to the present invention with reference to drawings.

Referring to FIGS. 1 through 6F, there is shown a first embodiment of a brake control system for a vehicle according to the present invention.

The brake control system is adapted to a regenerative coordinated brake control system which efficiently recovers regenerative energy by executing a brake hydraulic pressure reducing control during a control of regenerative braking torque via an alternating-current synchronous motor.

Figure 1:
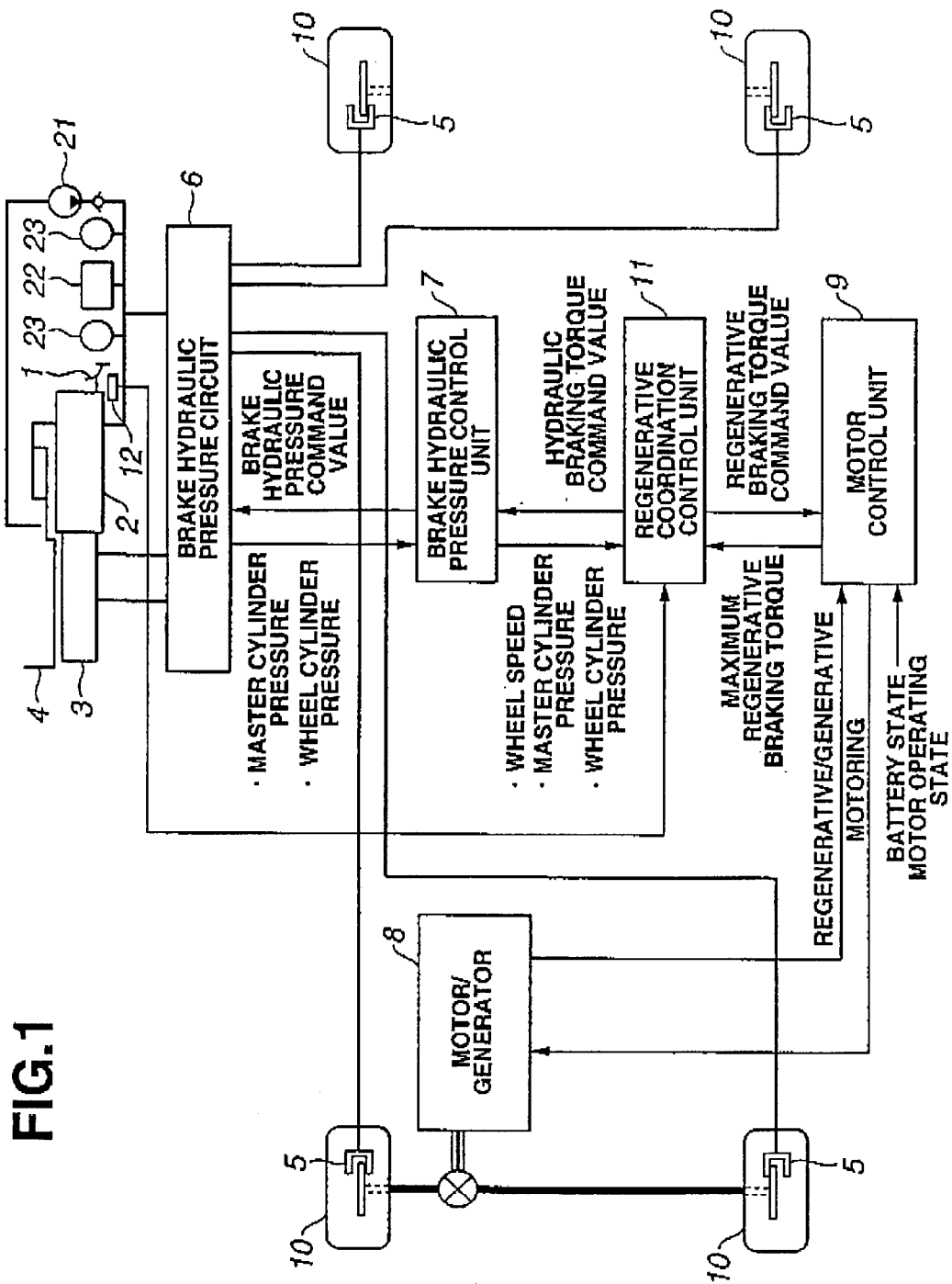
FIG. 1 is a schematic view showing a brake control system of a first embodiment according to the present invention.

As shown in FIG. 1, a brake pedal 1 manipulated by a driver is connected to a master cylinder 3 through a booster 2. Booster 2 boosts a brake pedal depressing force using a highly-pressured brake fluid which is pressurized by a pump 21 and stored in an accumulator 22. The boosted brake-pedal depressing force is applied to master cylinder 3. Pressure switches 23 are employed for the sequence control of pump 21. A reservoir 4 is fluidly connected to pump 21 and booster 2 through conduits. A brake pedal switch 12 is provided near brake pedal, 1 so as to be turned on in response to a depressing operation of brake pedal 1.

Master cylinder 3 is connected to each wheel cylinder 5 of each wheel 10. A brake hydraulic pressure circuit 6 is provided in each brake hydraulic passage between master cylinder 3 and each wheel cylinder 5 so as to be capable of independently controlling brake hydraulic pressure of each wheel cylinder 5. Brake hydraulic pressure circuit 6 receives a brake hydraulic pressure command value from a brake hydraulic pressure control unit 7.

Brake hydraulic pressure circuit 6 is capable of independently controlling the brake hydraulic pressure of each wheel cylinder 5 by connecting a stroke simulator having a fluid load equivalent to that of each wheel cylinder 5 to master cylinder 3, by increasing the pressure of wheel cylinder 5 through supplying an output pressure of pump 21 or a pressure or accumulator 22, and by decreasing the pressure of wheel cylinder 5 through returning the brake hydraulic fluid from wheel cylinder 5 to reservoir 4.

Brake hydraulic pressure circuit 6 comprises a master cylinder pressure sensor for detecting an output pressure of master cylinder 3 and wheel pressure sensors for detecting brake hydraulic pressures of the respective wheel cylinders 5 set in a separated state indicative that wheel cylinder 5 is separated from master cylinder 3. Detection signals of the master cylinder pressure sensor and the wheel cylinder pressure sensors are supplied to brake hydraulic pressure control unit 7.

On the other hand, front wheels 10 are driven by a motor/generator 8 of the alternating synchronous motor. Motor/generator 8 is capable of functioning as a motor for driving front wheels 10 while receiving electric power from a battery, and as a generator for generating electric power from a road drive torque of wheels 10 and for storing the electric power in the battery. When the electric power is stored (recovered) in the battery, the road drive torque is consumed to rotate motor/generator 8 and therefore braking torque is applied to the driving wheels 10. This braking is regenerative braking. The regenerative brake system in this first embodiment is arranged to be capable of applying the braking torque, whose absolute value is greater than an absolute value of a braking torque corresponding to that of an ideal braking torque distributions between the front wheels of the driving wheels and the rear wheels of the driven wheels, to the front wheels.

Motor/generator 8 is controlled according to the command from a motor control unit 9. More specifically, motor control unit 9 controls a drive operating state and a regenerative braking state of motor/generator 8. For example, when the vehicle starts running, motor/generator 8 functions as a motor to drive front wheels 10 acting as driving wheels. When the vehicle is coasting or decelerated, motor/generator 8 functions as a generator to apply a regenerative braking torque to wheels 10. Motor control unit 9 receives a motor/generator operating state indicative signal from motor/generator 8 and a battery operating state indicative signal as shown in FIG. 1.

Brake hydraulic pressure control unit 7 and motor control unit 9 are connected to a regenerative coordination control unit 11 through communication lines. Although brake hydraulic pressure control unit 7 and motor control unit 9 are capable of independently controlling the brake hydraulic pressure of wheel cylinder 5 and the operating state of motor/generator 8, respectively, the control using the regenerative coordination control unit 11 effectively recovers vehicle kinetic energy and thereby improves the fuel consumption.

More specifically, motor control unit 9 controls regenerative braking torque on the basis of the regenerative braking torque command value received from regenerative coordination control unit 11, calculates a maximum regenerative braking torque obtained from the battery charge state and temperature, and outputs the obtained maximum regenerative braking torque to regenerative coordination control unit 11. Brake hydraulic pressure control unit 7 controls the brake hydraulic pressure of each wheel cylinder 5 according to a hydraulic braking torque command value received from regenerative coordination control unit 11, and outputs the master cylinder pressure detected by the master cylinder pressure sensor and the wheel cylinder pressures detected by wheel cylinder pressure sensors to regenerative coordination control unit 11.

Each of regenerative coordination control unit 11, brake hydraulic pressure control unit 7 and motor control unit 9 is provided with a processor such as a microcomputer. Brake hydraulic pressure control unit 7 produces a control signal according to the hydraulic braking torque command and outputs the control signal to brake hydraulic pressure circuit 6. Motor control unit 9 produces a drive signal according to the regenerative braking torque command signal and outputs the drive signal to motor/generator 8. In contrast to this, regenerative coordination control unit 11 calculates the hydraulic braking torque command value and the regenerative braking torque command value which provide a proper deceleration in accordance with the driver's intent and perform a high recovery efficient of the vehicle kinetic energy. Further, regenerative coordination control unit 11 outputs the hydraulic braking torque command value and regenerative braking torque command value to brake hydraulic pressure control unit 7 and motor control unit 9, respectively.

Subsequently, there will be discussed a calculation processing for calculating the hydraulic braking torque command value and the regenerative braking torque command value. Regenerative coordination control unit 11 executes this processing, with reference to a flowchart of FIG. 2, and as a timer interruption processing executed at predetermined time intervals such as 10 msec. Although this flowchart does not have a step for communication, information obtained by the processing is properly stored, and the stored information is properly read according to need. Throughout the explanation of various values relating to the braking torque, such values relating to the braking torque are basically represented by negative values in contrast to a driving torque of a positive value. Therefore, magnitude relationships among various braking torques are slightly complicated. In order to facilitate the explanation thereof, such relationships will be explained basically using absolute values of various driving torques hereinafter.

At step S1, regenerative coordination control unit 11 reads a master cylinder pressure Pmc and a wheel cylinder pressure Pwc inputted from brake hydraulic pressure control unit 7.

At step S2, control unit 11 calculates an estimated deceleration $\alpha v$ by reading wheel speeds of four wheels of the vehicle from brake hydraulic pressure control unit 7 and by processing the maximum one of the wheels speed using a band pass filter represented by the following expression (1).

$$Fbpf(s)=s/(s^2/\omega^2+2\zeta s/\omega+1) \quad (1)$$

At step S3, control unit 11 reads a maximum regenerative braking torque Tmmax from motor control unit 9

At step S4, control unit 11 calculates a desired deceleration $\alpha$dem by multiplying a constant Ka(<0) determined from the vehicle specification with master cylinder pressure Pmc ($\alpha$dem=Ka·Pmc).

At step S5, control unit 11 calculates a feed-forward command value TdFF from desired deceleration $\alpha$dem, using a feed-forward compensator CFF(s) represented by the following expression (2).

$$CFF(s) = Kb \cdot Fref(s)/Pm(s) \quad (2)$$
$$= Kb \cdot (Tp \cdot s + 1)/(Tr \cdot s + 1)$$

where Kb is a constant determined from a vehicle specification, Fref(s)=1/(Tr·s+1) is a reference model, and Pm(s)=1/(Tp·s+1) is a controlled system model of wheel cylinder 5 and the like.

At step S6, control unit 11 determines whether or not master cylinder pressure Pmc is greater than or equal to a predetermined value $\epsilon$. When the determination at step S6 is affirmative (Pmc$\geq\epsilon$), the routine proceeds to step S7. When the determination at step S6 is negative (Pmc<$\epsilon$), the routine proceeds to step S8.

At step S7, control unit 11 calculates a reference deceleration $\alpha$ref from target deceleration $\alpha$dem using a reference model Fref(s), calculates a feedback deviation $\Delta\alpha$ by subtracting estimated deceleration $\alpha$V from reference deceleration $\alpha$ref, and calculates a feedback compensation value TdFB from feedback deviation $\Delta\alpha$ using a feedback compensator CFB(s) represented by the following expression (3).

$$CFB(s)=(Kp \cdot s+Ki)/s \quad (3)$$

where Kp and Ki are constants determined from a gain margin and a phase margin.

Further, control unit 11 calculates a desired braking torque Tdcom representative of a braking torque to be generated by the vehicle, by adding feed-forward command value TdFF to feedback compensation value TdFB. Thereafter, the routine proceeds to step S9.

On the other hand, at step S8 control unit 11 sets desired braking torque Tdcom at feed-forward command value Tdff calculated at step S5, and initializes a parameter employed in the calculation of feedback compensation value TdFB at step S7. Thereafter, the routine proceeds to step S8.

At step S9, control unit 11 divides maximum regenerative braking torque Tmmax into a low-frequency component regenerative torque limit value TmmaxL and a high-frequency component regenerative torque limit value TmmaxH using the following expressions (4).

$$TmmaxL=Tmmax \times Kkato$$
$$TmmaxH=Tmmax \times (1-Kkato) \quad (4)$$

where Kkato is a constant with a range from 0 to 1.

The low-frequency component regenerative torque limit value TmmaxL represents a limit value for generating low-frequency components of desired braking torque Tdcom, and the high-frequency component regenerative torque limit value TmmaxH represents a limit value for generating high-frequency components of desired braking torque Tdcom.

At step S10, control unit 11 divides desired braking torque Tdcom into a low-frequency component TdcomL indicative of a total quantity of the low-frequency components of the desired braking torque, and a high-frequency component TdcomH indicative of a total quantity of the high-frequency components of the desired braking torque. More specifically, control unit 11 calculates high-frequency component TdcomH from desired braking torque Tdcom using a high-pass filter Fhpf(s) represented by the following expression (5), and calculates low-frequency component TdcomL by subtracting high-frequency component TdcomH from desired braking torque Tdcom. This high-pass filter Fhpf(s) has been designed taking account of the characteristics of the hydraulic brake system and the regenerative brake system. For example, a cutoff frequency of a transmission band of the high-pass filter is set such that the hydraulic brake system cannot perform the proper responsibility in braking if a component of the braking torque to be generated is higher than the cutoff frequency.

$$Fhpf(s)=Thp \cdot s/(Thp \cdot s+1) \quad (5)$$

At step S11, control unit 11 commands motor/generator 8 to generate a torque corresponding to low-frequency component TdcomL of the desired braking torque at front wheels 10 with a high priority, and commands wheel cylinders 5 of rear wheels 10 to generate the braking torque obtained by subtracting low-frequency component regenerative torque limit value TmmaxL from low-frequency component TdcomL when an absolute value of low-frequency component TdcomL of the desired driving torque is greater than an absolute value of low-frequency component regenerative torque limit value TmmaxL, so that a distribution of braking torque to front and rear wheels 10 is brought closer to an ideal braking torque distribution. More specifically, on the basis of low-frequency component TdcomL calculated at step S10 and with reference to map data shown in FIG. 5, control unit 11 calculates ideal distribution TdcomLF and TdcomLR for front and rear wheels. Further, control unit 11 calculates a desired regenerative braking torque Tmcom for the front wheels and desired hydraulic pressure braking torque TbcomF and TbcomR for the front and rear wheels, on the basis of a magnitude relationship of ideal distribution TdcomLF and TdcomLR relative to low-frequency component regenerative torque limit value TmmaxL, and using the following expressions (6), in order to generate low-frequency component TdcomL of the desired braking torque.

$$TmmaxL \leq TdcomLF+TdcomLR \leq 0$$
$$Tmcom=TdcomLF+TdcomLR$$
$$TbcomF=0$$
$$TbcomR=0$$
$$TdcomLF+TdcomLR<TmmaxL \leq TdcomLF \leq 0$$
$$Tmcom=TmmaxL$$
$$TbcomF=0$$
$$TbcomR=TdcomL-TmmaxL$$
$$(TdcomL=TdcomLF+TdcomLR)$$
$$TdcomLF<TmmaxL \leq 0$$
$$Tmcom=TmmaxL$$
$$TbcomF=TdcomLF-TmmaxL$$
$$TbcomR=TdcomLR \quad (6)$$

At step S12, control unit 11 calculates a regenerative braking torque command value Tmcom2 to be sent to motor control unit 9, by adding high-frequency component TdcomH of the desired braking torque to desired regenerative braking torque Tmcom calculated at step S1. Thereafter, the routine proceeds to step S13.

At step S13, control unit 11 calculates hydraulic braking torque command value PbcomF for front wheels by multiplying desired hydraulic pressure braking torque TbcomF by a constant Kc (PbcomF=TbcomF×Kc), and calculates hydraulic braking torque command value PbcomR for rear wheels by multiplying desired hydraulic pressure braking torque TbcomR by constant Kc (PbcomR=TbcomR×Kc).

At step S14, control unit 11 sends regenerative braking torque command value Tmcom2 to motor control unit 9 and sends hydraulic braking torque command values PbcomF and PbcomR for front and rear wheels to brake hydraulic pressure control unit 7.

Subsequently, there will be discussed a manner of operation of the first embodiment of the brake control system according to the present invention.

Figure 6A:
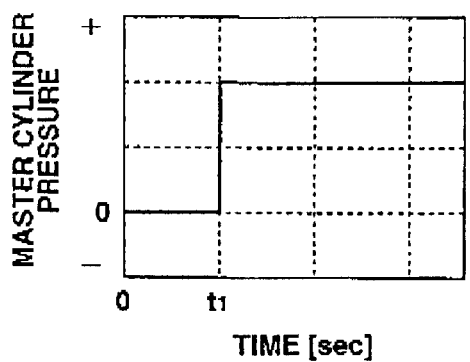
FIGS. 6A through 6F are graphs employed for explaining operations of the brake control system of the first embodiment according to the present invention.
Figure 6D:
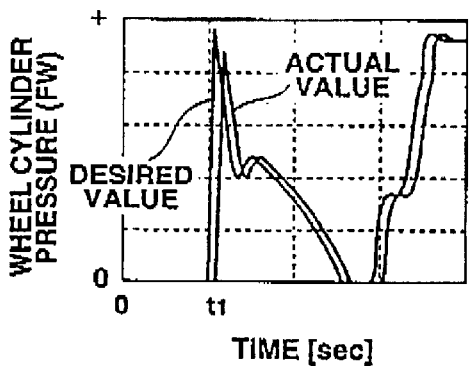

First, there will be discussed as to a case that regenerative coordination control unit 11 starts to execute the calculation processing when the driver depresses a brake pedal stepwise at a time t1 in FIG. 6A, in order to stop the vehicle.

In this case, at step S1 master cylinder pressure Pmc and wheel cylinder pressures Pwc are read from brake hydraulic pressure control unit 7. At step S2 the wheel speeds of the respective wheels 10 are read from brake hydraulic pressure control unit 7, and estimated deceleration αv is calculated from the wheel speeds. Further, at step 3 maximum regenerative braking torque Tmmax is read from motor control unit 9.

Figure 3:
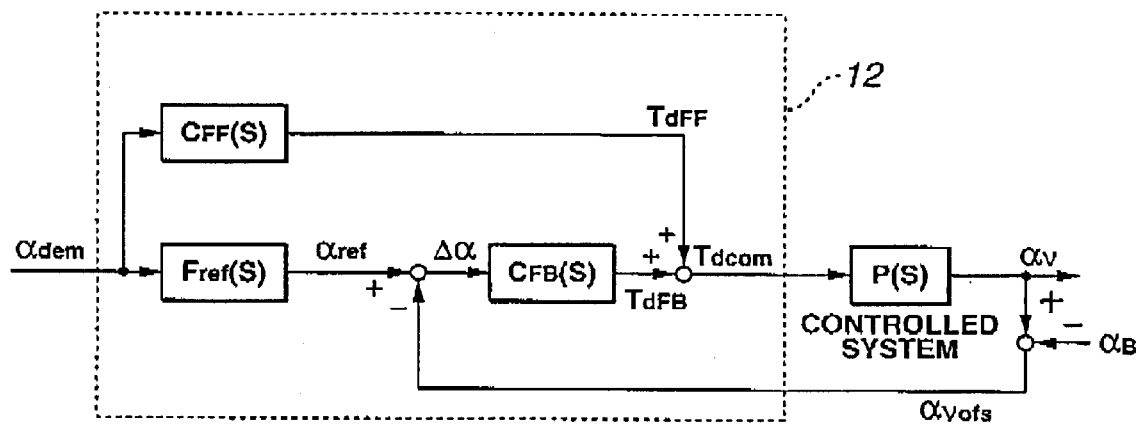
FIG. 3 is a block diagram employed for explaining a feed-forward command value and a feedback compensation value generated in the regenerative-coordination control unit of FIG. 1.
Figure 4:
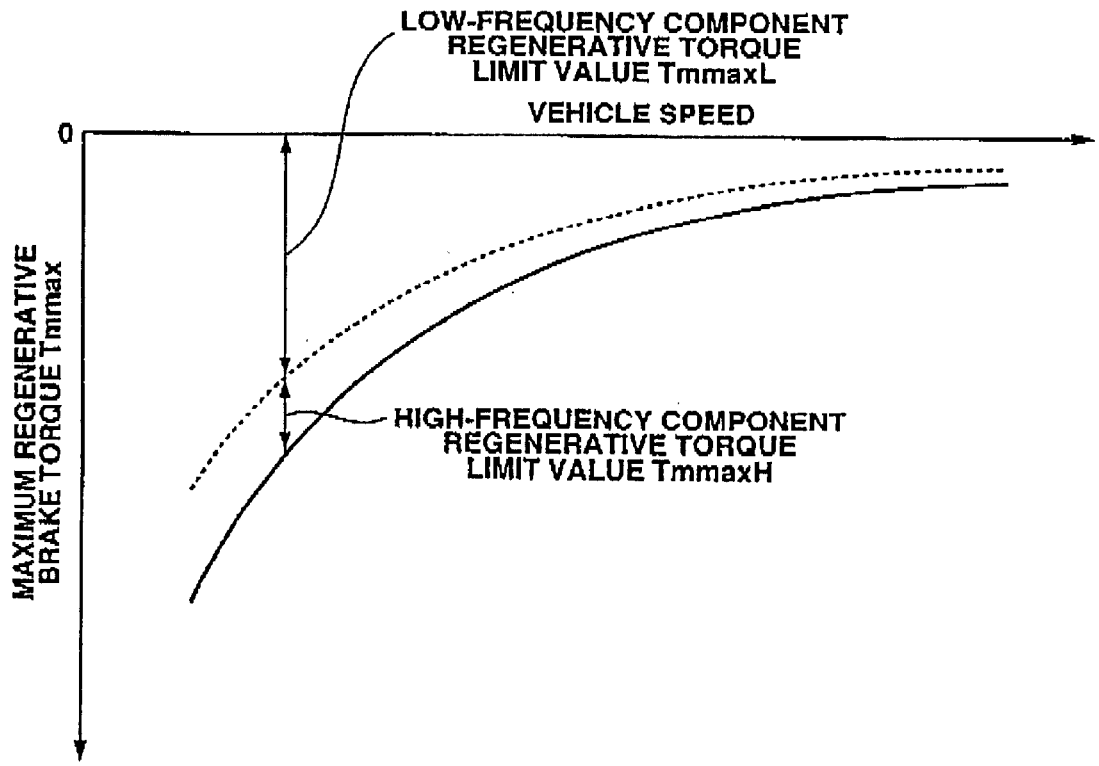
FIG. 4 is a graph employed for explaining a relationship between a low frequency component regenerative torque limit value and a high frequency component regenerative torque limit value.
Figure 5:
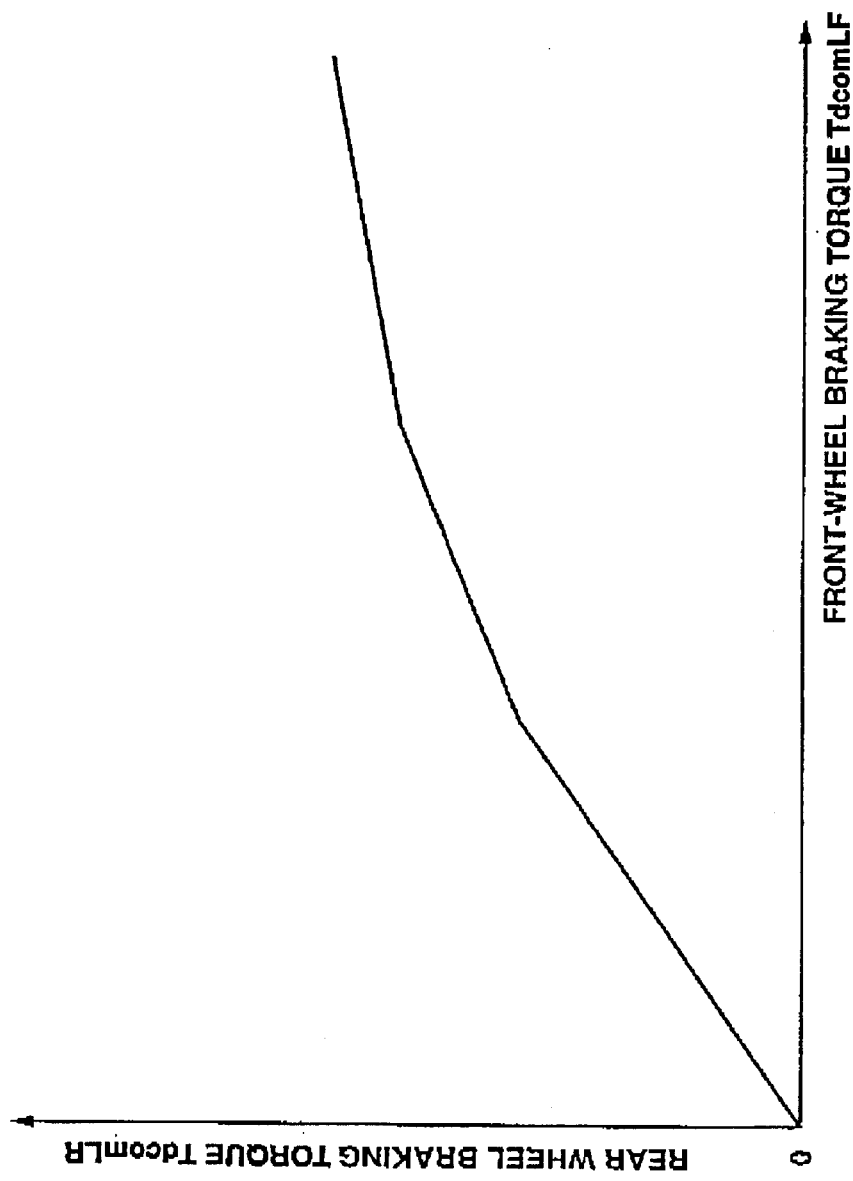
FIG. 5 is a map showing an ideal distribution of braking torque of front and rear wheels.

Subsequently, at step S4 desired deceleration αdem is calculated on the basis of master cylinder pressure Pmc. At step S5, on the basis of desired deceleration αdem calculated at step S4, feed-forward command value TdFF having a relatively low frequency is calculated. Further, since brake pedal 1 is depressed, the affirmative determination is made at step S6, and therefore at step S7 reference deceleration αref is calculated on the basis of desired deceleration αdem, feedback deviation Δα is calculated by subtracting estimated deceleration αv from reference deceleration αref, and feedback compensation value TdFB having relatively high-frequency component is calculated on the basis of feedback deviation Δα, as shown in FIG. 3. Then, desired braking torque Tdcom is calculated by adding feedback compensation value TdFB and feed-forward command value TdFF.

Subsequently, at step S9 maximum regenerative braking torque Tmmax is distributed into low-frequency component regenerator torque limit value TmmaxL and high-frequency component regenerative torque limit value TmmaxH. At step S1, desired braking torque Tdcom is divided into low-frequency component TdcomL and high-frequency component TdcomH. At step S11, desired hydraulic pressure braking torques TbcomF and TbcomR for front and rear wheels and desired regenerative braking torque Tmcom are calculated, so that low-frequency component TdcomL of the desired braking torque, which was calculated at step S10, is generated by motor/generator 8 of front wheels within low-frequency component regenerative torque limit value TmmaxL. Thereafter, at step S12, regenerative braking torque command value Tmcom2 is calculated by adding high-frequency component TdcomH of desired braking torque, which was calculated at step S10, to desired regenerative braking torque Tmcom. At step. S13, hydraulic braking torque command values PbcomF and PbcomR for front and rear wheels are calculated on the basis of desired hydraulic pressure braking torques TbcomF and TbcomR. At step S14, regenerative braking torque command value Tmcom2 are sent to motor control unit 9, and hydraulic braking torque command values PbcomF and PbcomR for front and rear wheels are sent to brake hydraulic pressure control unit 7.

Figure 6B:
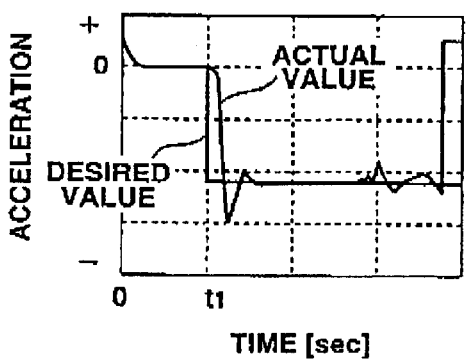
Figure 6E:
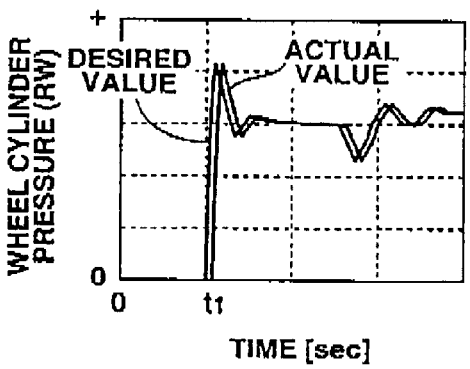
Figure 6C:
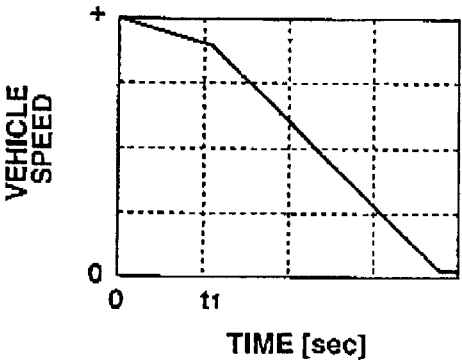
Figure 6F:
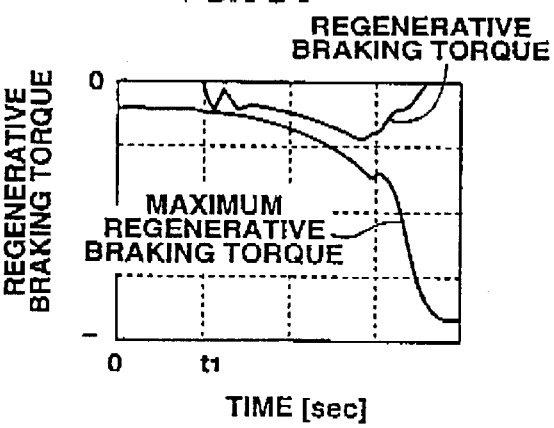

Thus, since high-frequency component TdcomH is divided from desired braking torque Tdcom and are distributed to motor/generator 8, this high-frequency component TdomH is generated at motor/generator 8 which has a high responsibility and a high resolution as compared with those of the hydraulic pressure braking. Accordingly, as shown in FIG. 6B, the brake control system of the first embodiment improves the following performance in response to a deceleration demanded by a driver.

Figure 23A:
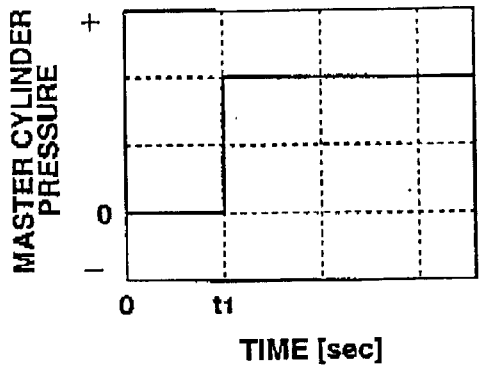
FIGS. 23A through 23F are graphs employed for explaining operations of a brake control system of an earlier technology.
Figure 23B:
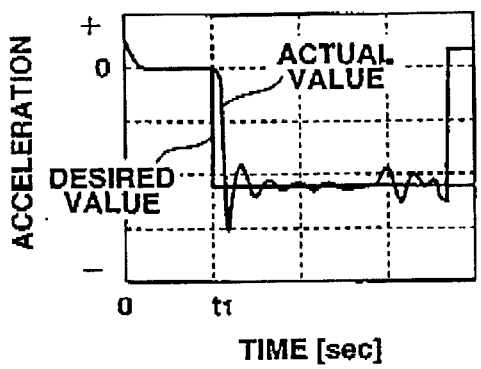
Figure 23C:
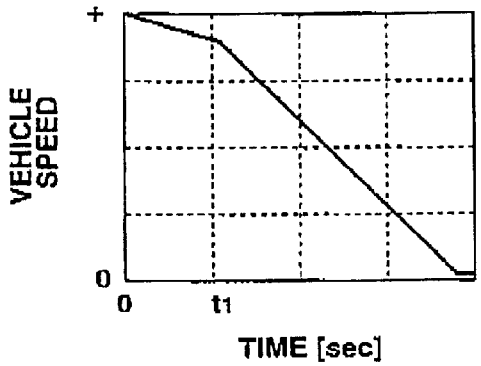
Figure 23D:
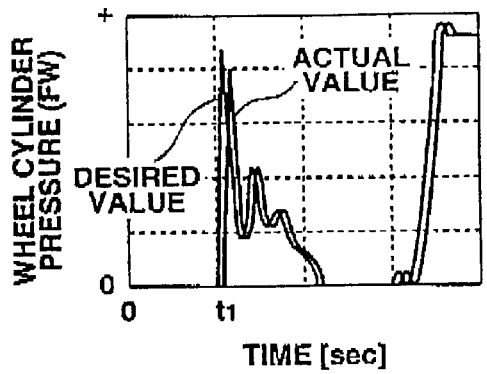
Figure 23E:
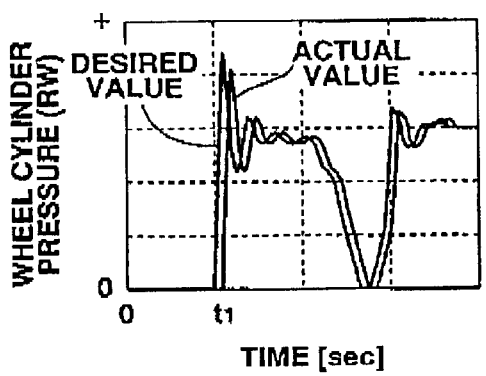
Figure 23F:
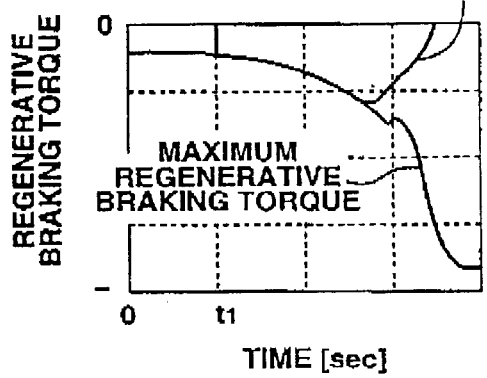

In contrast to this, if the regenerative braking is executed with a higher priority always in view of improving the fuel consumption, as shown in FIGS. 23A and 23F, motor/generator 8 generates maximum regenerative braking torque Tmmax according to a large deceleration. As a result, as shown in FIGS. 23D and 23E, it becomes impossible that the hydraulic brake system cannot generate a sufficient braking torque in response to feedback compensation value TdFB. Therefore, as shown in FIG. 23B, the following performance of the deceleration according to the driver's demand is degraded in this compared system shown in FIGS. 23A through 23F.

Subsequently, referring to FIGS. 7 through 9F, there is shown a second embodiment of the brake control system according to the present invention.

The second embodiment is arranged so as to manage both of the improvement in the following performance as to the deceleration according to the driver's demand and the improvement in fuel consumption, by setting an absolute value of low-frequency component regenerative torque limit value TmmaxL small when the depressing state of brake pedal 1 is in a transient state, and by setting the absolute value of low-frequency component regenerative torque limit value TmmaxL large when the depressing state is in a steady state. The steady state of the depressing state represents a state that a brake-pedal stroke does not change. Accordingly, desired deceleration αdem is not changed, and the absolute value of high-frequency component TdcomH of desired braking torque is set small in this steady state. On the other hand, the transient state of the depressing state of brake pedal 1 represents a state that a brake-pedal stroke is changed. Accordingly, desired deceleration αdem is being changed, and the absolute value of high-frequency component TdcomH of desired braking torque is set large in this transient state.

Figure 2:
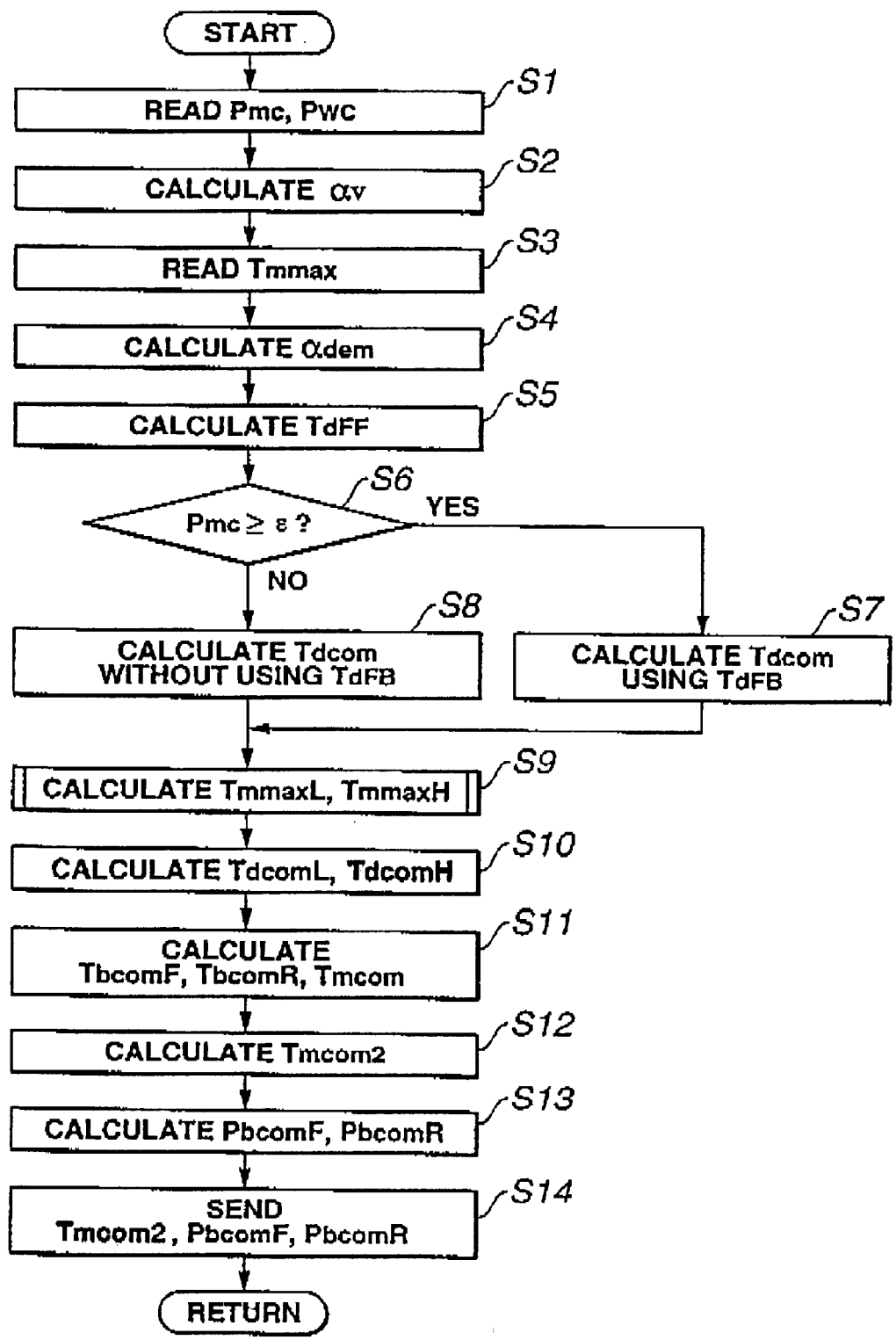
FIG. 2 is a flowchart showing a calculation processing executed by a regenerative-coordination control unit of FIG. 1.

More specifically, instead of step S9 of the flowchart shown in FIG. 2, a processing for distributing maximum regenerative braking torque Tmmax is employed. This distribution processing is executed as shown by a flowchart of FIG. 7.

Figure 7:
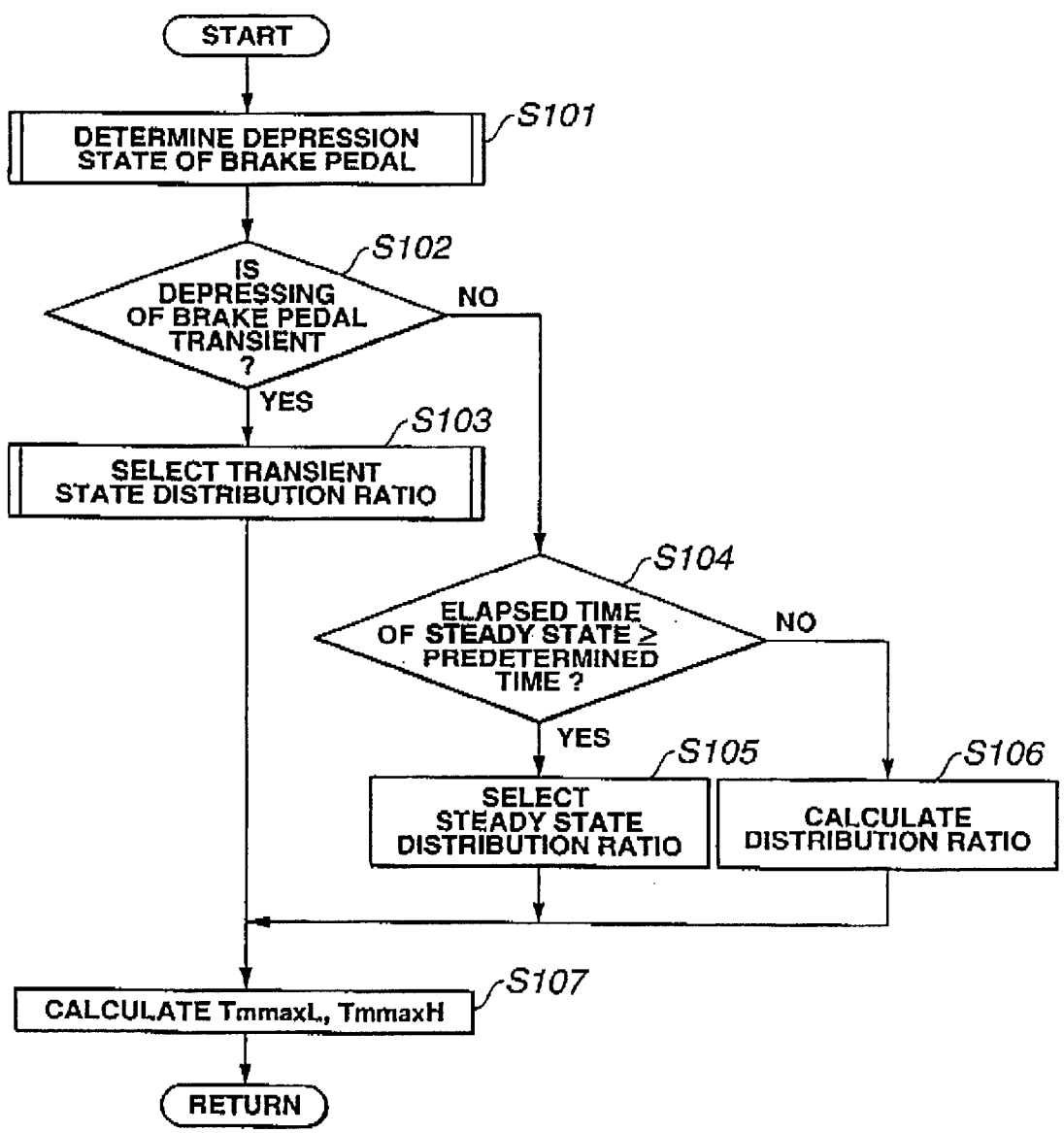
FIG. 7 is a flowchart showing a maximum regenerative braking torque distribution processing executed by the regenerative-coordination control unit of a second embodiment according to the present invention.

At step S101 in the flowchart of FIG. 7, control unit 11 determines whether a depression state of a brake pedal 1 depressed by the driver is in the transient state or steady state. When the depression state is in the transient state, control unit 11 resets a steady state flag F (F=0). When the depression state is in the steady state, control unit 11 resets steady state flag F at 1 (F=1). More, particularly, control unit 11 determines that the depression state is in the transient state during when a first predetermined time Tconv1 such as 5 seconds elapses from a moment when brake pedal switch 12 detects a depression of brake pedal 1. After first predetermined time Tconv1 elapsed, control unit 11 determines that the depression state is in the steady state.

At step S102 control unit 11 determines whether or not the depression state of brake pedal is in the transient state, that is, whether or not steady state flag F is reset (F=0?). When the determination at step S102 is affirmative (F=0), the routine proceeds to step S103. When the determination at step S102 is negative (F=1), the routine proceeds to step S104, At step S103 control unit 11 selects a transient state distribution ratio of maximum regenerative braking torque Tmmax. More specifically, control unit 11 sets a distribution ratio Kkato at a transient state distribution ratio K1 taking a relatively small value so that motor/generator 8 certainly generates high-frequency component TdcomH of the desired braking torque even if the absolute value of high-frequency component TdcomH of the desired braking torque is a relative large value, that is, so that the distribution ratio of the absolute value of low-frequency component TdcomL to motor/generator 8 is set at a relatively small value. Thereafter, the routine proceeds to step S107.

At step S104 control unit 11 determines whether or not an elapsed time Tc from a time t12 that steady state flag F is set at 1 is greater than or equal to a second predetermined time Tconv2. When the determination at step S104 is affirmative (Tc≧Tconv2), the routine proceeds to step S105. When the determination at step S104 is negative (Tc<Tconv2), the routine proceeds to step S106.

At step S105 control unit 11 selects a steady state distribution ratio of maximum regenerative braking torque Tmmax. More specifically, control unit 11 sets distribution ratio Kkato at a steady state distribution ratio K2 taking a relatively large value so that motor/generator 8 recovers regenerative energy further largely, that is so that the distribution ratio of the absolute value of low-frequency component TdcomL to motor/generator B is set at a relatively large value. Thereafter, the routine proceeds to step S107.

On the other hand, at step S106 control unit 11 calculates distribution ratio Kkato according to the elapsed time Tc. More specifically, control unit 11 determines distribution ratio Kkato on the basis of a linear function which takes transient state distribution ratio K1 when elapsed time Tc is equal to zero and which takes steady state distribution ratio K2 when elapses time Tc is equal to second predetermined time period Tconv2. Thereafter, the routine proceeds to step S107.

At step S107 control unit 11 calculates low-frequency component regenerative torque limit value TmmaxL and high-frequency component regenerative torque limit value TmmaxH from maximum regenerative braking torque Tmmax, using the expressions (4) and distribution ratio Kkato obtained at step S103, S105 or S106. Herein, low-frequency component regenerative torque limit value TmmaxL is for generating the low-frequency components of the desired braking torque obtained at step S7 or S8, and high-frequency component regenerative torque limit value TmmaxH is for generating the high-frequency components of the desired braking torque obtained at step S7 or S8. Thereafter, this routine returns to the main calculation processing.

Subsequently, the manner of operation of the second embodiment will be discussed in detail.

Figure 8:
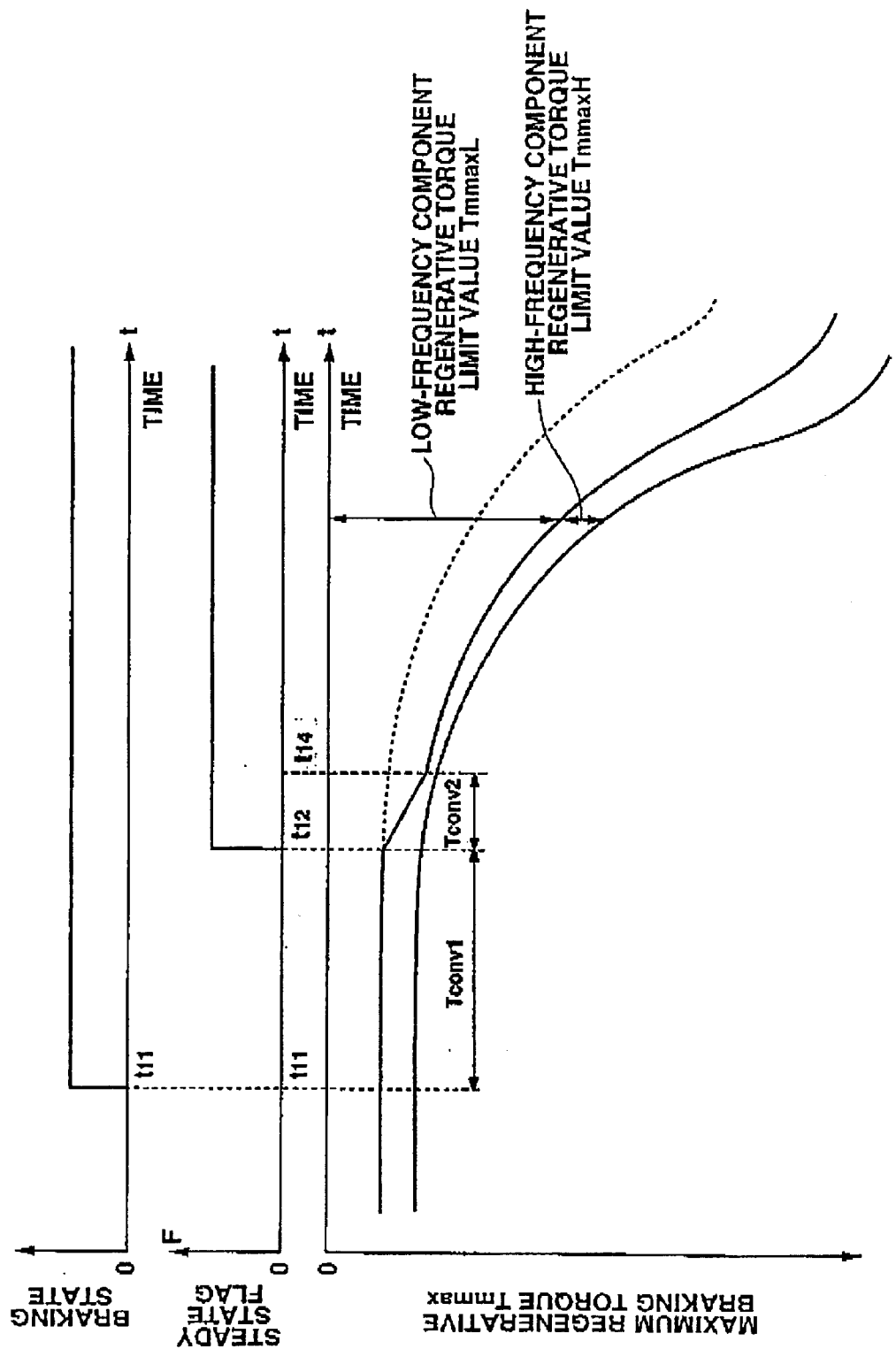
FIG. 8 is a graph employed for explaining operations of the brake control system of the second embodiment according to the present invention.

First, there will be discussed as to a case that regenerative coordination control unit 11 starts to execute the calculation processing when the driver depresses brake pedal 1 stepwise to stop the vehicle at a time t11 in FIGS. 8 and 9A.

At shown in FIG. 2, after the execution of steps S1 through S8, the processing for distributing maximum regenerative braking torque Tmmax shown in FIG. 7 is executed at step S9. At step S101 in FIG. 7, it is determined that the depression state of brake pedal is in the transient state. Accordingly, at step S102 the affirmative determination is made. At step S103 distribution ratio Kkato is set at transient state distribution ratio K1 of a relatively small value. At step S107 maximum regenerative braking torque Tmmax is divided into low-frequency component regenerative torque limit value TmmaxL of a relatively large value (the absolute value thereof is small), and high-frequency component regenerative torque limit value TmmaxH of a relatively small value (the absolute value thereof is large), according to distribution ratio Kkato set at step S103.

When the depression state is in the transient state, that is, when high-frequency component TdcomH of the desired torque is small (the absolute value thereof is large), low-frequency component regenerative torque limit value TmmaxL is set at a relatively large value (the absolute value thereof is set small) so that a ratio of a distribution quantity of the absolute value of low-frequency component TdcomL of the desired braking torque to motor/generator 8 is set at a relatively small ratio. Accordingly, high-frequency component regenerative torque limit value TmmaxH takes a relatively small value (the absolute value thereof is set large), and high-frequency component TdcomH is generated by motor/generator 8 which has a high responsibility and high resolution as compared with those of the hydraulic pressure braking. Consequently, the following performance to the deceleration demanded by the driver is improved as shown in FIG. 9B during a period from a time t11 through a time t12.

Further, there will be discussed as to a case that first predetermined time Tconv1 elapsed after the depression of brake pedal 1 was detected during the repeating of the above-discussed routine, corresponding to the time t12 in FIGS. 8 and 9A. In this case, at step S101 it is determined that the depression state is in the steady state. Therefore the negative determination is made at step S102 and step S104. At step S106 subsequent to the negative is determination at step S104, distribution ratio Kkato is calculated so as to gradually approach steady state distribution ratio K2. At step S107 maximum regenerative braking torque Tmmax is divided into low-frequency component regenerative torque limit value TmmaxL of a relatively small value (the absolute value thereof is set large) and high-frequency component regenerative torque limit value TmmaxH of a relatively large value (the absolute value thereof is set small), according to distribution ratio Kkato set at step S106.

Furthermore, there will be discussed as to a case that second predetermined time Tconv2 elapsed after control unit 11 determined at step S101 that the depression state of brake pedal 1 is in the steady state during the repeating of the above-discussed routine, corresponding to a time t14 in FIGS. 8 and 9F. In this case, at step S104 the affirmative determination is made. At step S105 subsequent to the affirmative determination at step S104, distribution ratio Kkato is set at steady state distribution ratio K2 of a relatively large value. At step S107 maximum regenerative braking torque Tmmax is divided into low-frequency component regenerative torque limit value TmmaxL of a relatively small value (the absolute value thereof is set large) and high-frequency component regenerative torque limit value TmmaxH of a relatively large value (the absolute value thereof is set small), according to distribution ratio Kkato set at step S105.

In this second embodiment, when the depression state of brake pedal 1 is in the steady state, that is, when high-frequency component TdcomH of the desired braking torque is large, that is, when the absolute value of high-frequency component TdcomH is small, the absolute value of low-frequency component regenerative torque limit value TmmaxL is set large so as to increase a ratio of the distribution quantity of the absolute value of low-frequency component TdcomL of desired braking torque to be generated at motor/generator 8. Accordingly, motor/generator 9 generates almost all of maximum regenerative braking torque Tmmax. This increases the recovery quantity of regenerative energy as shown in a range from a time t12 to d time t13 in FIG. 9C, and therefore the fuel consumption is improved.

Figure 24A:
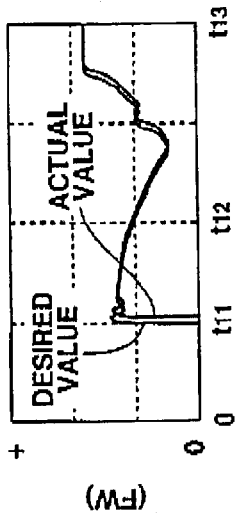
FIGS. 24A through 24F are graphs employed for explaining operations of the brake control system wherein a distribution ratio is set at a constant, value.
Figure 24B:
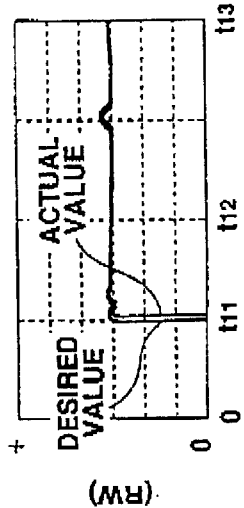
Figure 24C:
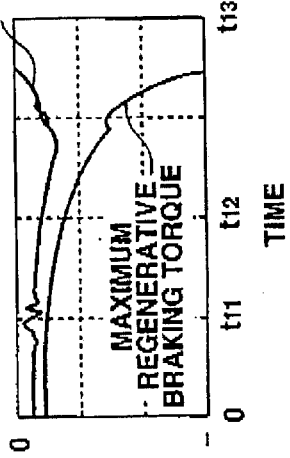
Figure 24D:
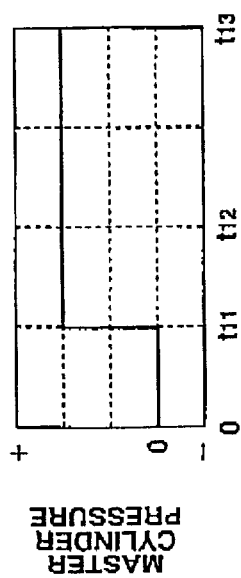
Figure 24E:
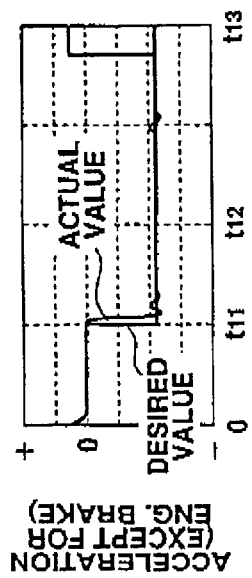
Figure 24F:
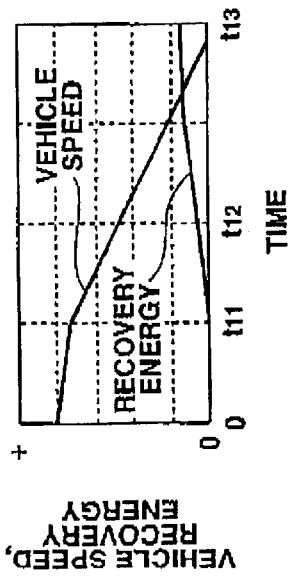

In contrast to this, if distribution ratio Kkato is always set at transient state distribution ratio K1 in view of improving the control performance, the improvement of the fuel consumption is suppressed. More specifically, as shown in a, range from time t12 to time t13 in FIGS. 24C and 24F, when the depression state is in the steady state, that is, even when high-frequency component TdcomH of desired braking torque is large (the absolute value thereof is set small), low-frequency component regenerative torque limit value TmmaxL is set at a relatively large value (the absolute value thereof is set small). Accordingly, motor/generator 8 does not generate maximum regenerative braking torque Tmmax, as shown in FIG. 24F. This invites the decrease of the recovery quantity of regenerative energy and therefore the improvement of the fuel consumption is suppressed.

Further, the second embodiment according to the present invention is arranged to determine that the depression state is in the transient state until first predetermined time Tconv1 elapses from a moment that brake pedal switch 12 detects the depression of brake pedal 1, and to determine that the depression state is in the steady state after predetermined time Tconv1 elapses from the detection of the brake-pedal depression. Accordingly, it becomes possible that the detection of the depression state of brake pedal 1 is simply determined as compared with the determination method, which determines the depression state from a pattern of the braking operation of the driver.

Figure 10:
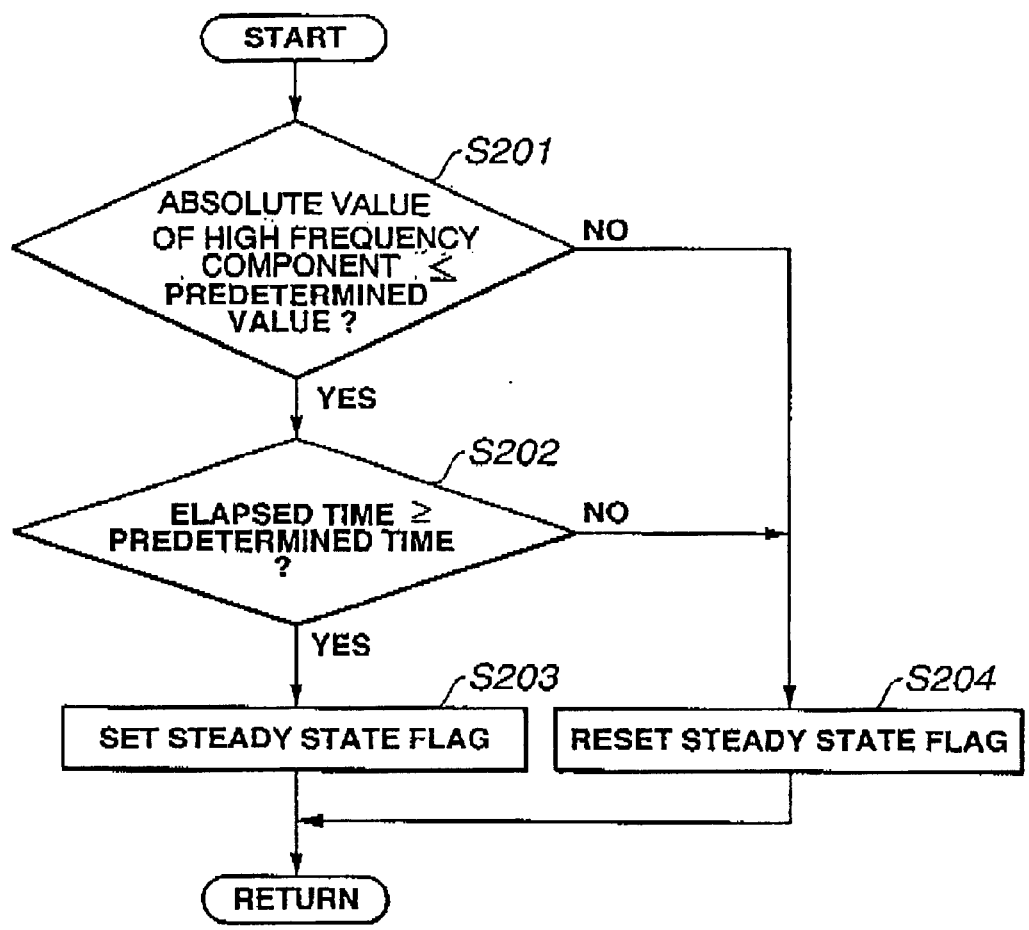
FIG. 10 is a flowchart showing a brake state determination processing executed by the regenerative-coordination control unit of a third embodiment according to the present invention.
Figure 11D:
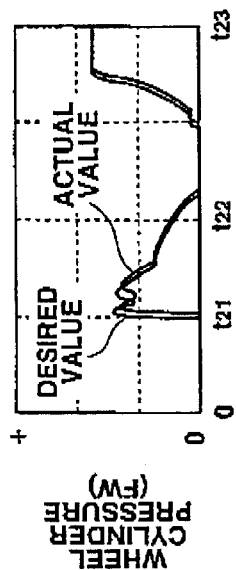
FIGS. 11A through 11F are graphs employed for explaining operations of the brake control system of the third embodiment according to the present invention.
Figure 11E:
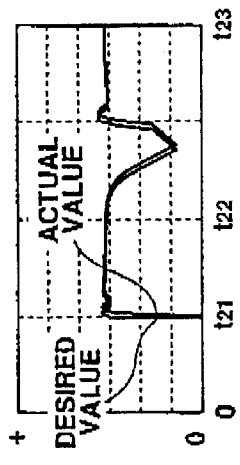
Figure 11F:
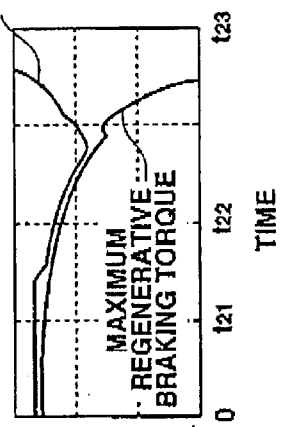

Referring to FIGS. 10 through 11F, there is shown a third embodiment of the brake control system according to the present invention.

The third embodiment is specifically arranged to improve the efficiency of the energy recovery via the regenerative braking during the slow braking operation by the driver, by determining that the depression state of brake pedal 1 is in the steady state where high-frequency component TdcomH of the desired torque is large (the absolute value thereof is set small), when a condition that a magnitude of high-frequency component TdcomH is smaller than or equal to a predetermined value is maintained for a predetermined time. More specifically, instead of step S101 in the flowchart of FIG. 7, a flowchart for executing brake depression state determination processing shown in FIG. 10 is employed:

At step S201 of the flowchart in FIG. 10, control unit 11 calculates high-frequency component TdcomH from desired braking torque Tdcom using a high-pass filter. Further, control unit 11 determines whether or not an absolute value |TdcomH| of high-frequency component TdcomH is smaller than or equal to a predetermined value β of a relatively small value. When the determination at step S201 is affirmative, the routine proceeds to step S202. When the determination at step S201 is negative, the routine proceeds to step S204.

At step S202 control unit 11 determines whether or not an elapsed time Tc1 after absolute value |TdcomH| became smaller than predetermined value β is, greater than or equal to a predetermined time Tstatic. When the determination at step S202 is affirmative, the routine proceeds to step S203. When the determination at step S202 is negative, the routine proceeds to step S204.

At step S203 control unit 11 determines that the depression state of brake pedal 1 is in the steady state, and sets steady state flag F at 1 (F=1). Thereafter, the routine returns to the flowchart of FIG. 7.

At step S204 control unit 11 determines that the depression state is in the transient state, and resets steady state flag F (F=0). Thereafter, the routine returns to the flowchart of FIG. 7.

Subsequently, there will be discussed the manner of operation of the third embodiment according to the present invention.

Figure 11A:
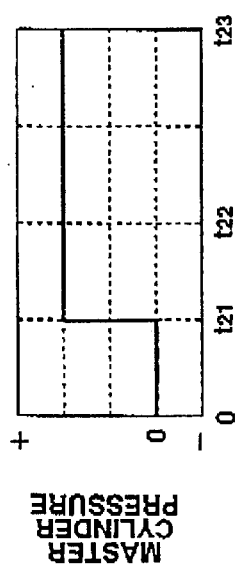
Figure 11B:
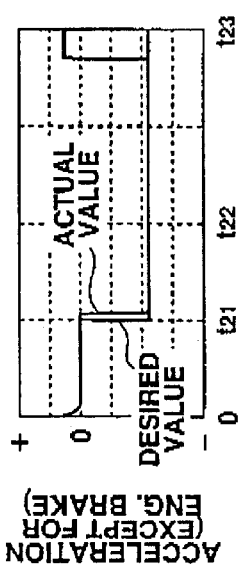
Figure 11C:
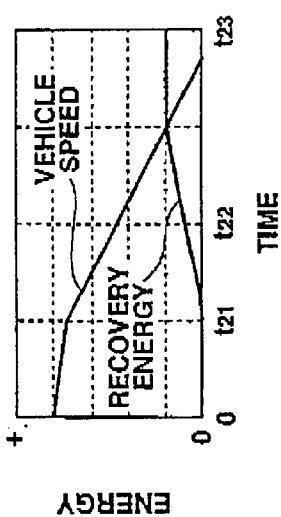

First, there will be discussed as to a case that regenerative coordination control unit 11 starts to execute the calculation processing when the driver depresses brake pedal 1 stepwise to stop the vehicle in response to an external condition such as a traffic condition, as shown by a part at a time t21 in FIG. 11A.

In this case, at shown in FIG. 2, after the execution of steps S1 through S8 the processing for distributing low-frequency component regenerative torque limit value TmmaxL shown in FIG. 7 is executed at step S9. At step S101 in FIG. 7, the brake depression state determination processing shown in FIG. 10 is executed. When it is determined that the absolute value of high-frequency component TdcomH of desired braking torque is greater than predetermined value P, the negative determination is made at step S201 in FIG. 10. Therefore, at step S204, it is determined that the depression state of brake pedal is in the transient state.

With the thus arranged the third embodiment according to the present invention, it is determined that the depression state of brake pedal 1 is in the transient state when the absolute value of high-frequency component TdcomH of desired braking torque is greater than predetermined value β. Accordingly, distribution ratio Kkato is set at the transient state distribution ratio of a relatively large value, and high-frequency component TdcomH is generated by motor/generator 8 which performs high-responsibility and high-resolution as compared with those of the hydraulic pressure braking. Therefore, the following performance to the deceleration demanded by the driver is improved. Further, since the depression operating condition of brake pedal 1 is determined on the basis of the absolute value of high-frequency component TdcomH of the desired braking torque, it becomes possible to incorporate a vehicle state including a vehicle weight and a pad $\mu$ (friction coefficient of a brake pad) in the determination of the depression state.

Further, in a case that predetermined time Tstatic has elapsed while keeping the condition that the absolute value of high-frequency component TdcomH of desired braking torque is smaller than predetermined value β during the repeating of the above-discussed programs, the affirmative determination is made at step S201 and at step S202. Therefore, at step S203, it is determined that the depression state is the steady state.

Thus, with the third embodiment according to the present invention, when predetermined time Tstatic elapsed while keeping the condition that the absolute value of high-frequency component TdcomH of desired braking torque is smaller than or equal to predetermined value α, it is determined that the depression state of brake pedal 1 is in the steady state. Accordingly, when the absolute value of the high-frequency component of the desired braking torque becomes small, distribution ratio Kkato is promptly set at steady state distribution ratio K2, and motor/generator 8 generates low-frequency component TdcomL partly or fully. This increases the recovery quantity of the regenerative energy as shown by a range from a time t21 to a time t23 in FIG. 11C, and therefore the fuel consumption is improved.

Figure 25D:
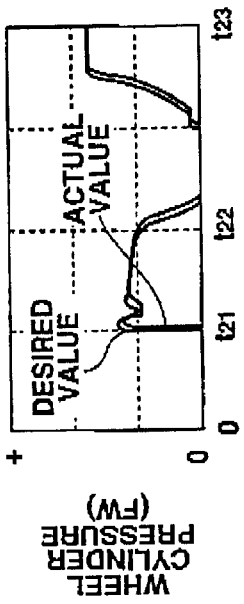
FIGS. 25A through 25F are graphs employed for explaining operations of the brake control system wherein it is determined that a state of the braking operation is in a steady state when a predetermined time period elapsed from a moment when a brake pedal is depressed.
Figure 25E:
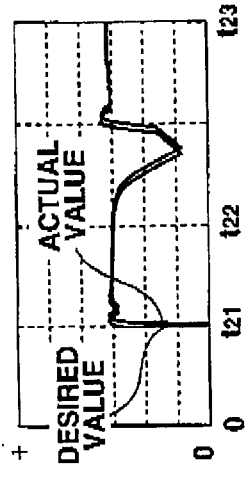
Figure 25F:
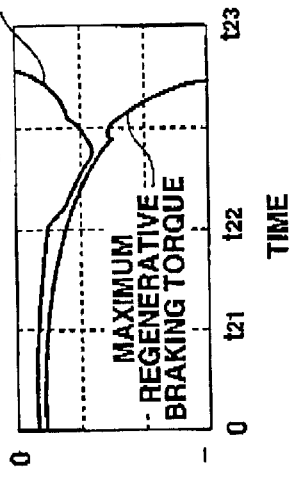
Figure 25A:
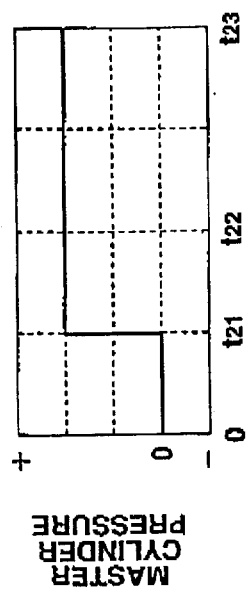
Figure 25B:
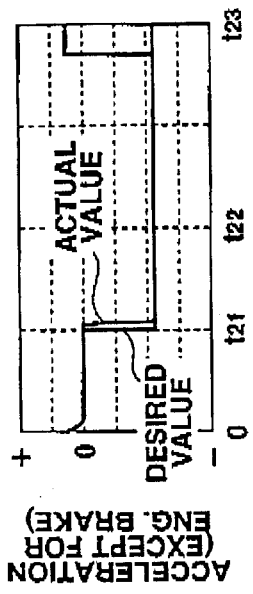
Figure 25C:
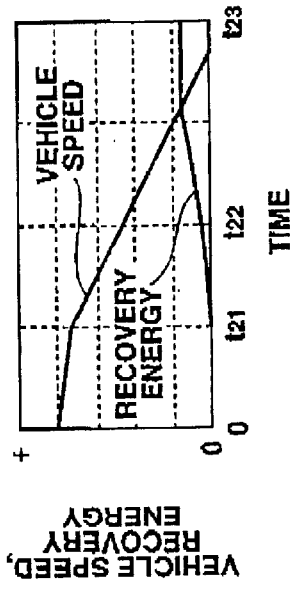

In contrast to this, if it is determined that the depression state is in the transient state until a predetermined time elapses from a moment when the depression of brake pedal 1 is detected, operation results shown in FIGS. 25A through 25F are obtained. As shown in a range from a time t21 to a time t23 in FIGS. 25b and 25F, even after the absolute value of high-frequency component TdcomH of desired braking torque becomes small, the absolute value of low-frequency component regenerative torque limit value TdcomL is set at a relatively small value. Accordingly, until the predetermined time elapsed, motor/generator 8 does not generate maximum regenerative braking torque Tmmax. As a result, the recovery quantity of the regenerative energy becomes small as shown in FIG. 25C.

Further, there will be discussed as to a case that the driver executes a slow braking operation within a range where the absolute value of high-frequency component TdcomH of the desired braking torque becomes smaller than or equal to predetermined value β during the repeating of the above discussed routine.

In this case, the affirmative determinations are made at both steps S201 and S202. At step S203, it is determined that the depression state of brake pedal 1 is in the steady state.

In this third embodiment, when the absolute value of high-frequency component TdcomH of desired braking torque is smaller than predetermined value A, it is determined that the depression state of brake pedal 1 manipulated by the driver is in the steady state. Accordingly, when the absolute value of high-frequency component TdcomH of desired braking torque is small, steady state distribution ratio K2 is set as distribution ratio Kkato, and motor/generator 8 partly or fully generates low-frequency component TdcomL. This increases the recovery quantity of the regenerative energy.

Subsequently, referring to FIGS. 12 through 14F, there is shown a fourth embodiment of the brake control system according to the present invention.

The fourth embodiment is arranged to set the absolute value of low-frequency component regenerative torque limit value TmmaxL small when the absolute value of the operation speed of brake pedal 1 is large, and to set the absolute value of low-frequency component regenerative torque limit value TmmaxL large when the absolute value of the operation speed of brake pedal 1 is small, so as to improve the following performance to the deceleration demanded by the driver and the fuel consumption.

Figure 12:
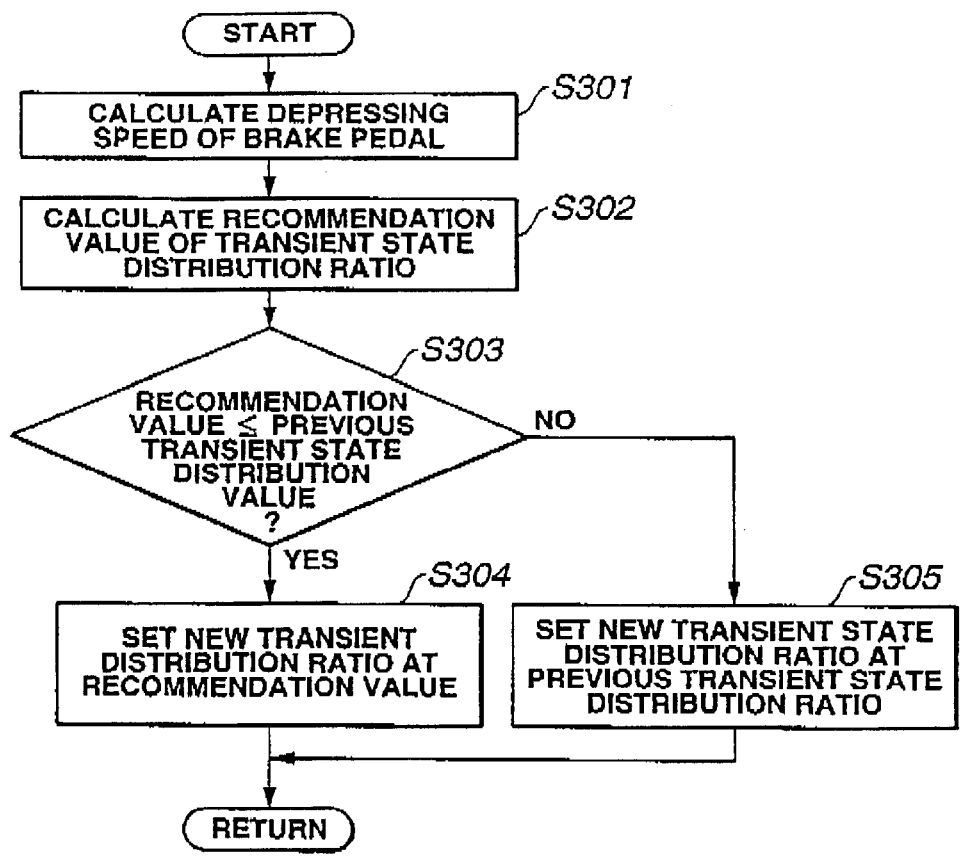
FIG. 12 is a flowchart showing a transient state distribution ratio setting processing executed by the regenerative-coordination control unit of a fourth embodiment according to the present invention.

More specifically, instead of step S103 shown in the flowchart of FIG. 7, a flowchart of FIG. 12 is employed. This flowchart of FIG. 12 shows a transient state distribution ratio setting processing.

At step S301 in this flowchart shown in FIG. 12, control unit 11 calculates a depression speed $V_{BP}$ of braking pedal 1 depressed by the driver from a changing state of master cylinder pressure Pmc read at step S1.

Figure 13:
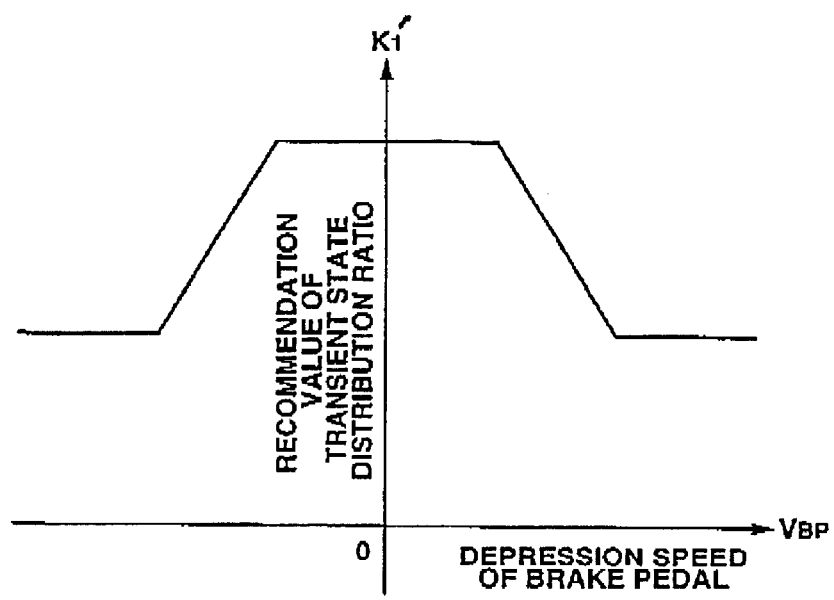
FIG. 13 is a map showing a relationship between a brake pedal operating speed and the transient state distribution ratio.
Figure 14A:
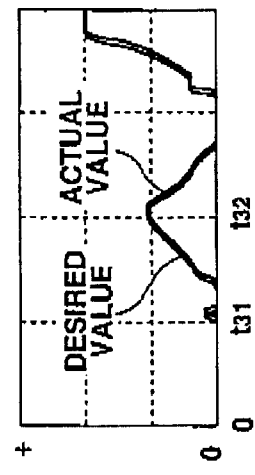
FIGS. 14A through 14f are graphs employed for explaining operations of the brake control system of the fourth embodiment according to the present invention.
Figure 14B:
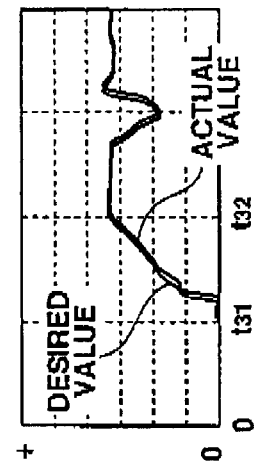
Figure 14C:
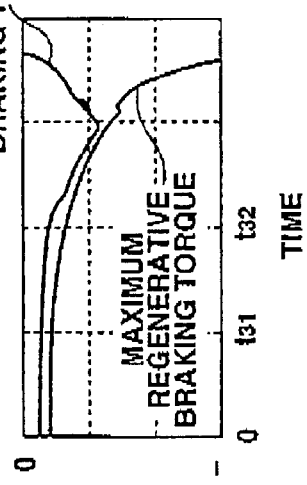
Figure 14D:
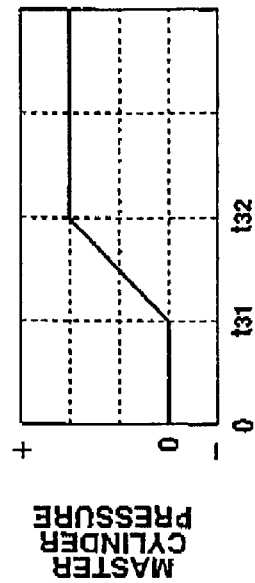
Figure 14E:
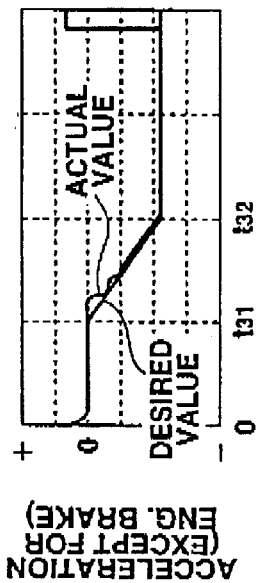
Figure 14F:
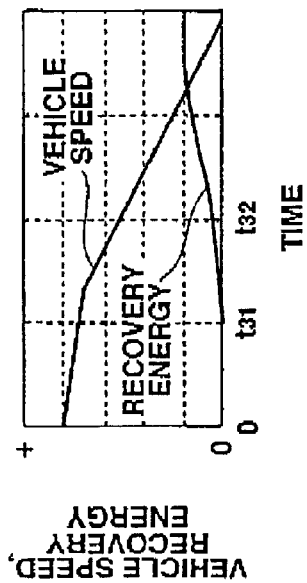

At step S302 control unit 11 calculates a recommendation value K1' of transient state distribution ratio on the basis of a control map of FIG. 13 and depressing speed $V_{BP}$ of brake pedal 1 so that the absolute value of low-frequency component regenerative torque limit value TmmaxL becomes small when the absolute value of the operation speed of brake pedal 1 is large and that the absolute value of low-frequency component regenerative torque limit value TmmaxL becomes large when the absolute value of the operation speed of brake pedal 1 is small The control map of FIG. 13 represents such that transient state distribution ratio recommendation value K1' takes a relatively large constant value when the absolute value of depression speed $V_{BP}$ of brake pedal 1 is in a small-value range, that recommendation value K1' takes a relatively small constant value when the absolute value of depression speed $V_{BP}$ of brake pedal 1 is in a large-value range, and that recommendation value K1' linearly decreases according to the increase of the absolute value of the depression speed $V_{BP}$ of brake pedal 1 when depression speed $V_{BP}$ takes a value between the small-value range and the large-value range.

At step S303 control unit 11 determines whether or not recommendation value K1' calculated at step S302 is smaller than or equal to transient state distribution ratio K1 calculated in the previous calculation processing. When the determination at step S303 is affirmative (K1'≦K1), the routine proceeds to step S304. When the determination at step S303 is negative (K1'>K1), the routine proceeds to step S305.

At step S304 control unit 11 employs recommendation value K1' calculated at step S302 as transient state distribution ratio K1. Thereafter, the routine returns to the flowchart of FIG. 7.

At step S305 control unit 11 employs the previous transient state distribution ratio K1 obtained in the previous calculation processing as a new transient state distribution ratio K1. Thereafter, the routine returns to the flowchart of FIG. 7.

Subsequently, there will be discussed the manner of operation of the fourth embodiment according to the present invention.

First, there will be discussed as to a case that regenerative coordination control unit 11 starts to execute the calculation processing when the driver slowly depresses brake pedal 1 to stop the vehicle in response to an external condition such as a traffic condition, as shown by a part at a time t31 in FIGS. 14A through 14F.

In this case, as shown in FIG. 2, after the execution of steps S1 through S8, the processing for distributing maximum regenerative braking torque Tmmax shown in FIG. 7 is executed at step S9. At step S103 in FIG. 7, the calculation processing for determining the transient state distribution ratio K1 is executed after the execution of steps S101 and S102. At step S301, the absolute value of depression speed $V_{BP}$ of brake pedal 1 is calculated at a small value from the changing condition of master cylinder Pmc. At step S302, recommendation value K1' is set at a large value on the basis of the control map of FIG. 13 and the depressing speed $V_{BP}$ calculated at step S301. Accordingly, the affirmative determination is made at step S303. Herein, there has been previously determined an initial value of the previously determined transient state distribution ratio at the steady state distribution ratio K2, and when a comparing operation at step S303 is first executed after the start of the braking operation, this previously determined initial value is employed as a previously determined transient state distribution ratio. Thereafter, at step S304 recommendation value K1' calculated at step S302 is employed as a new transient state distribution ratio K1.

With the thus arranged fourth embodiment, even when the depression state of brake pedal 1 is in the transient state, when the absolute value of depression speed $V_{BP}$ of brake pedal 1 is small, that is, when the absolute value of high-frequency component TdcomH of desired braking torque is small, the absolute value of low-frequency component regenerative torque limit value TmmaxL is set large so that the ratio of the distribution quantity of the absolute value of low-frequency component TdcomL in desired braking torque becomes large. Accordingly, motor/generator 8 partly or fully generates low-frequency component TdcomL, and the recovery quantity of the regenerative energy becomes large as shown at a range from a time t31 to a time t32 in FIG. 14C. This improves the fuel consumption.

In contrast, if distribution ratio Kkato is set at transient state distribution ratio K1 of the constant value when it is determined that the depression state of brake pedal 1 is in the transient state, as shown in FIGS. 26A through 26F, the absolute value of low-frequency component recovery torque limit value TmmaxL is set at a relatively small value, even when the absolute value of high-frequency component TdcomH of desired braking torque is small as shown in the range from a time t31 to a time t32 in FIG. 26F. Accordingly, motor/generator 8 does not generate maximum regenerative braking torque Tmmax, and the recovery quantity of the regenerative energy becomes small as shown in FIG. 26C.

Subsequently, there will be discussed as to a case that control unit 11 executes the calculation processing when the brake pedal 1 is depressed stepwise.

In this case, at step S301 depression speed $V_{BP}$ is set at a large value from the changing condition of master cylinder pressure Pmc. At step S302 recommendation value K1' is set at a small value on the basis of the control map of FIG. 13 and depression speed $V_{BP}$ calculated at step S301. At step S303 the affirmative determination is made, and therefore the routine proceeds to step S304 wherein recommendation value K1' is employed as a new transient state distribution ratio K1.

With this arrangement of the fourth embodiment according to the present invention, even when the depression state of brake pedal 1 is in the transient state and when the absolute value of depression speed $V_{BP}$ of brake pedal 1 is large, that is, when the absolute value of high-frequency component TdcomH of desired braking torque is large, the absolute value of low-frequency component regenerative torque limit value TmmaxL is set small so that the ratio of the distribution quantity of the absolute value of low-frequency component TdcomL in desired braking torque becomes small Accordingly high-frequency component TdcomH is generated by motor/generator 8, which has the high-responsibility and high resolution. This further improves the following performance relative to the deceleration demanded by the driver.

Referring to FIGS. 15 through 22, there is shown a fifth embodiment of the brake control system according to the present invention.

FIG. 15 shows the brake control system adapted to a following control system which executes a following control for following a preceding vehicle ahead of a host vehicle by controlling a braking torque generated by a pump-up type brake actuator and an engine brake.

Front wheels 101FL and 101FR function as driven wheels, rear wheels 101RL and 101RR function as driving wheel. Rear wheels 101RL and 101RR receive a driving torque of an engine 102 through an automatic transmission 103, a propeller shaft 104, a final reduction gear 105 and axles 106. A disc brake 107 for generating a braking torque is provided at each of front and rear wheels, 101FL, 101FR, 101RL and 101RR. A brake controller 108 controls a hydraulic brake pressure of each disc brake 107.

Figure 16:
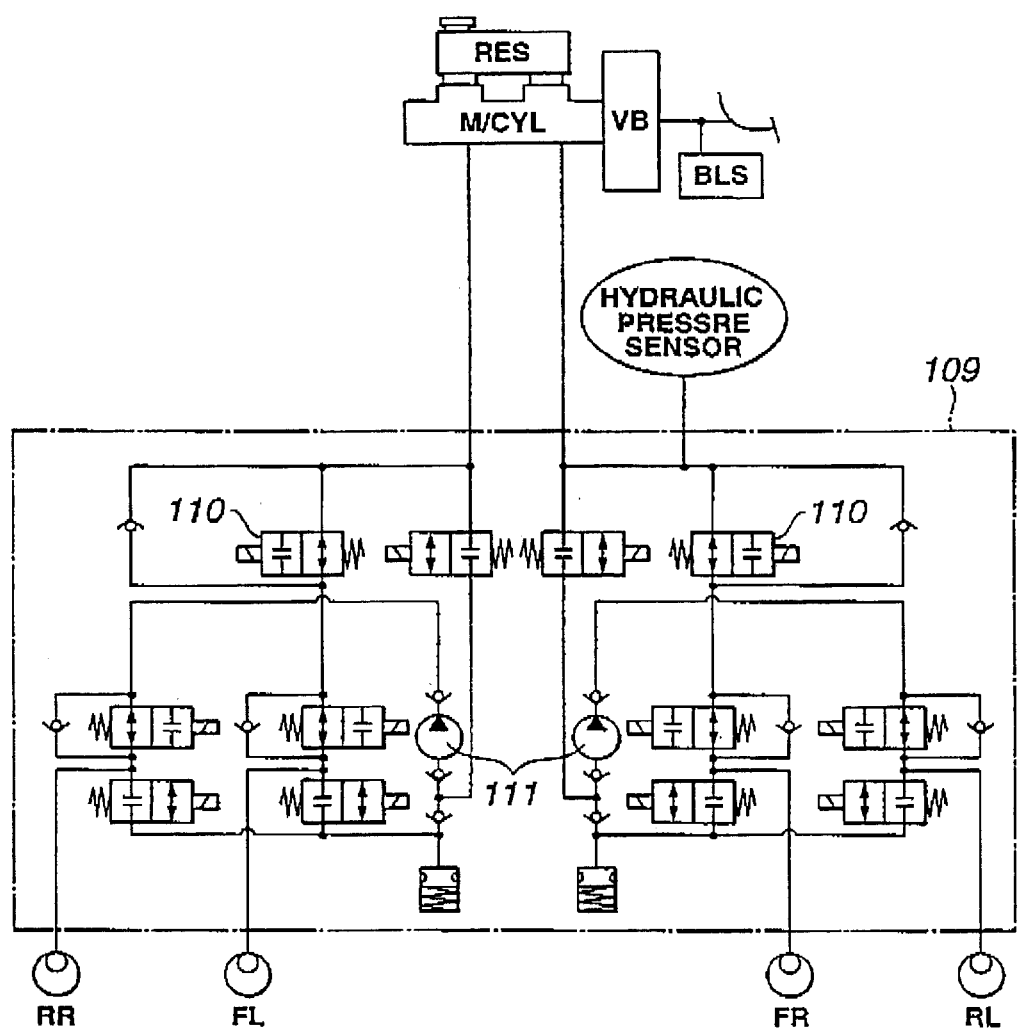
FIG. 16 is an enlarged view of an essential part of a pump-up type brake actuator employed in FIG. 15.

Brake controller 108 generates a brake hydraulic pressure according to a depression degree of a brake pedal (not shown). Brake controller 108 receives a brake command value $P_B$ from a following controller 115, and commands brake actuator 109 to generate a brake hydraulic pressure according to a magnitude of brake command value $P_B$ and to supply the generate brake hydraulic pressure to each disc brake 107. As shown in FIG. 16, brake actuator 109 comprises current-proportional valves 110 and motor-drive pumps 111. Brake actuator 109 controls brake hydraulic pressure to be supplied to each disc brake 107 by controlling current-proportional valves 110 and motor-drive pumps 111 according to control signals outputted from brake controller 108.

Further, a throttle actuator 112 is attached to an engine 102 to control an output of engine 102. Throttle actuator 112 comprises a vacuum pump and a solenoid for being connected to atmosphere. Throttle actuator 112 controls an engine speed of engine 102 by controlling throttle opening of engine 102 according to a command value θ outputted from a following controller 115 through a control of the pump and the solenoid.

On the other hand, there is provided an inter-vehicle distance sensor 113 for detecting an inter-vehicle distance $L_T$ between the host vehicle and a preceding vehicle ahead of the host vehicle at a front and lower portion of a vehicle body of the host vehicle. As an inter-vehicle distance sensor, there may be employed a radar device for measuring inter-vehicle distance $L_T$ by outputting a laser beam frontward and receiving a reflection of the laser beam from the preceding vehicle, or a distance sensor employing radio-wave or ultrasonic. Further, a vehicle speed sensor 114 for detecting a host vehicle speed $V_T$ is provided at an output side of automatic transmission 103. Vehicle speed sensor 114 detects host vehicle speed $V_T$ by detecting a rotation speed of an output shaft of automatic transmission 103.

Controller 115 receives output signals of inter-vehicle distance sensor 113 and vehicle speed sensor 114, and controls brake controller 108 and throttle actuator 112 on the basis of inter-vehicle distance $L_T$ detected by inter-vehicle distance sensor 113 and host vehicle speed $V_T$ detected by vehicle speed sensor 114 so as to bring the inter-vehicle distance closer to a desired proper distance.

Controller 115 comprises a microcomputer and a peripheral device thereof. A control block shown in FIG. 17 is constructed in the form of software and stored in the microcomputer.

Figure 17:
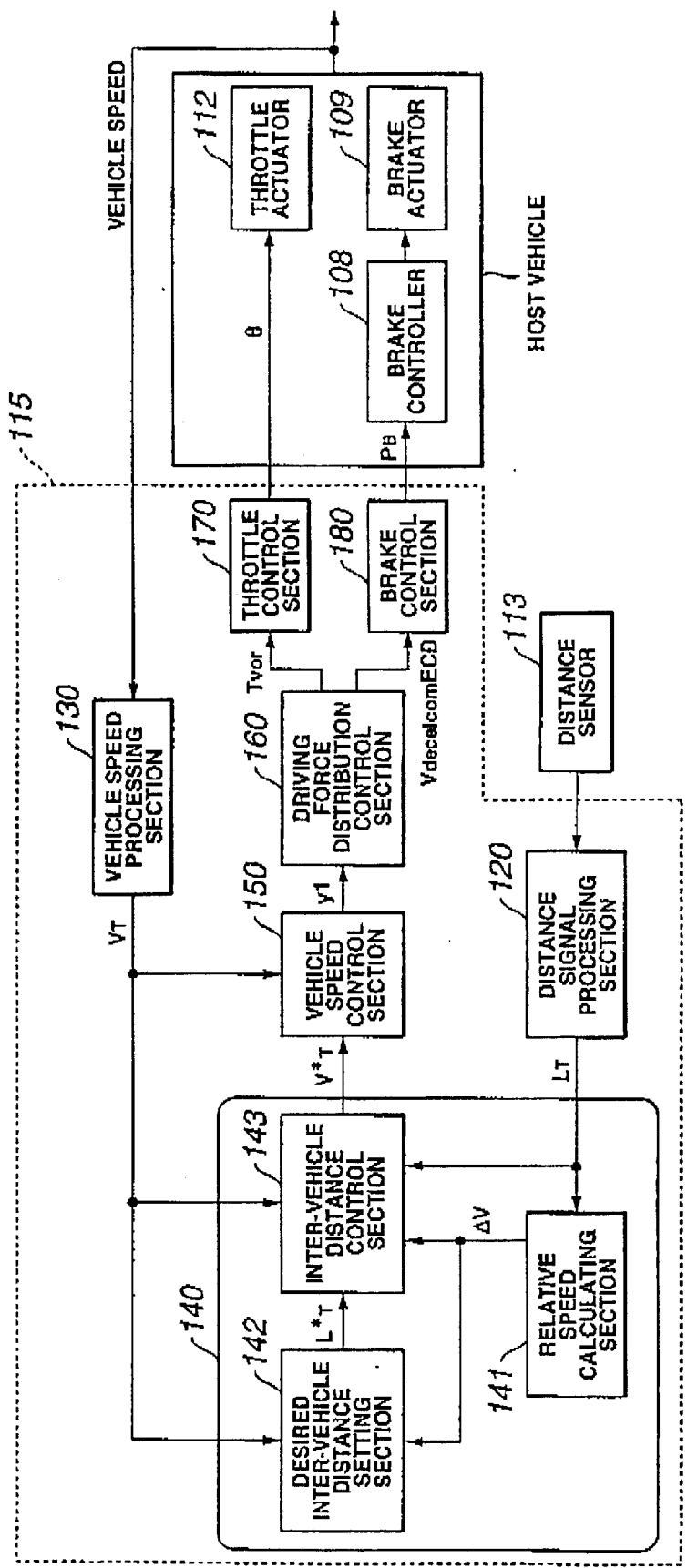
FIG. 17 is a block diagram showing a calculation process executed by a following controller of FIG. 15.

This control block of FIG. 17 comprises a distance signal processing section 120, a vehicle speed signal processing section 130, an inter-vehicle distance control section 140, a vehicle speed control section 150, a driving torque distribution control section 160, and a throttle control section 170. Distance signal processing section 120 outputs inter-vehicle distance $L_T$ by measuring time period from a moment of emitting laser beam to a moment of receiving a reflection light from the preceding vehicle. Vehicle speed signal processing section 130 outputs host vehicle speed $V_T$ by measuring a cycle of a vehicle speed indicative pulse outputted from vehicle speed sensor 114. Inter-vehicle distance control section 140 calculates a desired inter-vehicle distance $L_T^*$ on the basis of host vehicle speed $V_T$ and inter-vehicle distance $L_T$ and outputs a desired vehicle speed $V_T^*$ for bringing inter-vehicle distance $L_T$ closer to desired inter-vehicle distance $L_T^*$. Vehicle speed control section 150 outputs a final driving torque command value y1 for bringing host-vehicle speed $V_T$ closer to desired vehicle speed $V_T^*$. Driving torque distribution control section 160 outputs a desired throttle opening Tvor and a deceleration command value VdecelcomECD on the basis of final driving torque command value y1. Throttle control section 170 outputs throttle command value θ on the basis of desired throttle opening Tvor. Brake control section 180 which outputs brake command value $P_B$ on the basis of deceleration command value VdecelcomECD.

Inter-vehicle distance control section 140 comprises a relative speed calculating section 141 which output a relative speed between the preceding vehicle and the host Vehicle on the basis of inter-vehicle distance $L_T$ outputted from distance signal processing section 120, a desired inter-vehicle distance setting section 142 which outputs desired inter-vehicle distance $L_T^*$. On the basis of relative speed ΔV and host vehicle speed $V_T$ outputted from vehicle speed signal processing section 130, and an inter-vehicle distance control section 143 which outputs desired vehicle speed $V_T^*$ on the basis of desired inter-vehicle distance $L_T^*$, relative speed ΔV and host vehicle speed $V_T$.

Relative speed calculating section 141 is constructed by a band-pass filter which executes a filter processing of inter-vehicle distance $L_T$. A transfer function of this band-pass filter is represented by the following expression (7). Since a numerator of this expression (7) includes a differential term of Laplace operator, relative speed ΔV is approximately calculated by substantially differentiating inter-vehicle distance $L_T$.

$$F(s)=\omega n^2 s/(s^2+2\zeta\omega ns+\omega n^2) \tag{7}$$

where ωn=2πfn, s is Laplace operator, and ζ is an attenuation coefficient.

The cutoff function fn of this expression (7) is determined from a magnitude of noise included in inter-vehicle distance $L_T$ and an allowance of a acceleration fluctuation in the vehicle fore-and-aft direction during a short period. Further, in the calculation of relative speed ΔV, a high-pass filter employed in the high-pass filter processing of inter-vehicle distance $L_T$ may be used instead of the band-pass filter.

Desired inter-vehicle distance setting section 142 calculates desired inter-vehicle distance $L_T^*$ on the basis of a preceding-vehicle speed $V_T$ obtained by adding relative speed ΔV to host-vehicle speed $V_T$ and a time period T0 (headway time) needed that the host vehicle reaches a position L0 [m] backward of the preceding vehicle, using the following expression (8).

$$L_T^* = Vt \times T0 + Ls \tag{8}$$

where Ls is an inter-vehicle distance during a vehicle stop state.

Figure 18:
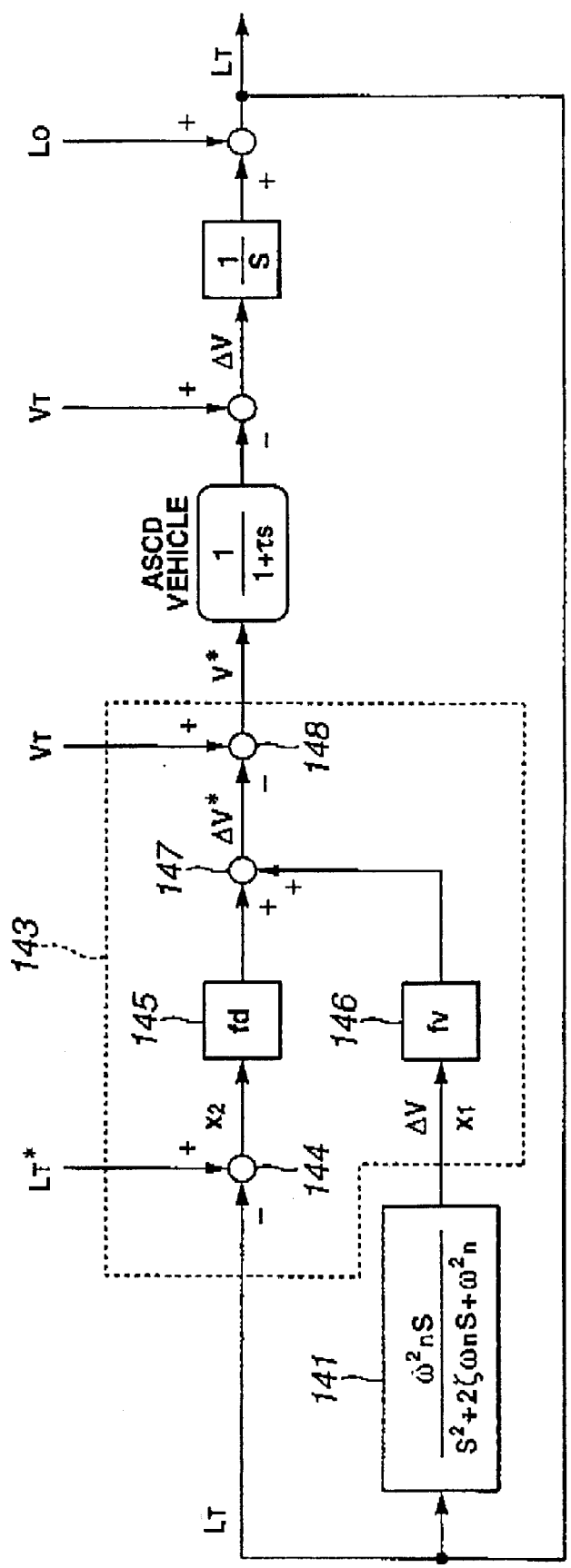
FIG. 18 is a block diagram showing a calculation process executed by an inter-vehicle distance control section of FIG. 17.

Subsequently, with reference to a block diagram of FIG. 18, there will be discussed inter-vehicle distance control section 143.

Inter-vehicle distance control section 143 comprises a state feedback compensator which is constructed by a so-called state feedback method. In this state feedback compensator, a state variable x2 is obtained at an adder-subtracter 144 by subtracting inter-vehicle distance $L_T$ from desired inter-vehicle distance $L_T^*$. Further, desired relative speed ΔV* is obtained at an adder-subtracter 147 by adding a multiple of state variable x2 and a gain f, which multiple is obtained at a multiplier 145, and a multiple of relative speed ΔV (hereinafter, relative speed ΔV is called a state variable x1) and a gain fv which multiple is obtained at a multiplier 146. Furthermore, desired vehicle speed $V^{T*}$ is obtained at an adder-subtracter 148 by subtracting desired relative speed ΔV* from host vehicle speed $V_T$, and is then outputted. Herein, a state equation of a system including this state feedback compensator can be expressed by the flowing expressions (9), and a characteristic equation thereof can be expressed by the following expression (10).

$$\frac{d}{dt}\begin{bmatrix} \dot{x}_1 \\ \dot{x}_2 \end{bmatrix} = \begin{bmatrix} -1/\tau_v & 0 \\ -1 & 0 \end{bmatrix}\begin{bmatrix} X_1 \\ X_2 \end{bmatrix} + \begin{bmatrix} 1/\tau_v \\ 0 \end{bmatrix}\Delta V^* \quad (9)$$

$$= \begin{bmatrix} -1/\tau_v & 0 \\ -1 & 0 \end{bmatrix}\begin{bmatrix} X_1 \\ X_2 \end{bmatrix} + \begin{bmatrix} 1/\tau_v \\ 0 \end{bmatrix}(f_v x_1 + f_d x_2)$$

$$= \begin{bmatrix} -1/\tau_v & 0 \\ -1 & 0 \end{bmatrix}\begin{bmatrix} X_1 \\ X_2 \end{bmatrix} + \begin{bmatrix} 1/\tau_v \\ 0 \end{bmatrix}[f_v \;\; f_d]\begin{bmatrix} x_1 \\ x_2 \end{bmatrix}$$

$$\dot{X} = (A + BF)X$$

where $X = \begin{bmatrix} X_1 \\ X_2 \end{bmatrix}$, $A = \begin{bmatrix} -1/\tau_v & 0 \\ -1 & 0 \end{bmatrix}$, $B = \begin{bmatrix} 1/\tau_v \\ 0 \end{bmatrix}$, (10)

and $F = \lfloor f_v \;\; f_d \rfloor$. $|sI - A'| = S^2 + \frac{(1-f_v)}{\tau_v}S + \frac{f_d}{\tau_v} = 0$ where $A' = (A + BF) = \begin{bmatrix} (f_v - 1)/\tau_v & f_v/\tau_v \\ -1 & 0 \end{bmatrix}$.

Accordingly, on the basis of a predetermined characteristic equation ($s^2+2\zeta\omega ns+\omega n^2=0$), which properly represents a characteristic during when inter-vehicle distance $L_T$ follows up desired inter-vehicle distance $L_T^*$, gains $f_d$ and $f_v$ are set using the following expressions (11).

$f_v=1-2\zeta\omega n\cdot\tau_v$ $f_d=\omega n^2\cdot\tau_v$ (11)

Figure 19:
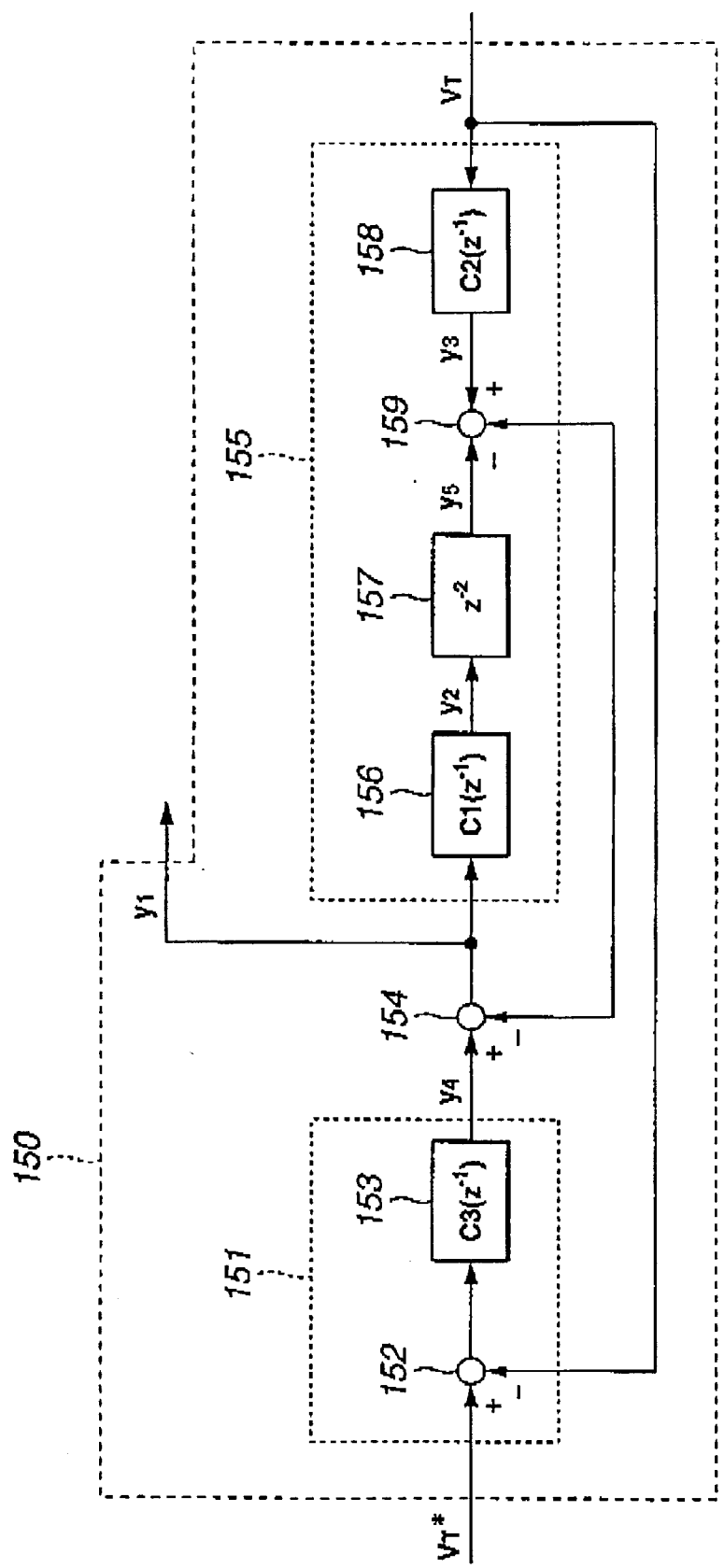
FIG. 19 is a block diagram showing a calculation processing executed by a vehicle speed control section of FIG. 17.

Subsequently, there will be discussed vehicle speed control section 150 on the basis of a block diagram of FIG. 19. Vehicle speed control section 150 is constructed by a model matching control technique and an approximate zeroing control technique.

A model matching compensator 151 of vehicle speed control section 150 calculates a speed difference by subtracting host vehicle speed $V_T$ from desired vehicle speed $V_T^*$ at an adder-subtracter 152, and outputs a driving torque command value y4 from a compensator 153 where a transfer function C3 ($z^{-1}$)=(1−exp(−T/Ta))·M/T, where M is an average vehicle weight, and T is a sampling cycle. This compensator 153 converts the speed difference obtained at adder-subtracter 152 into a reference model of a preset transient characteristic. A final driving torque command value y1 is obtained at an adder-subtracter 154 by subtracting a disturbance outputted from a disturbance estimator 155 from driving torque command value y4.

On the other hand, an output y5 is obtained at disturbance estimator 155 by processing final driving torque command value y1 using a low-pass filter 156 having a time constant Tb and adding a waste-time to the filter processed value at a waste-time adding section 157. The obtained output y5 is outputted from waste-time adding section 157. Low-pass filter 156 is constructed by a transfer function C1 ($z^{-1}$)=t1−γ·$z^{-1}$) where γ=exp(−T/Tb). Waste-time adding section 157 is constructed by a transfer function $z^{-2}$. Further, a phase compensating section 158 executes a phase justification of host vehicle speed $V_T$ and outputs an output y3. An adder-subtracter 159 obtains the disturbance by subtracting output y5 from output y3 and outputs the disturbance. Phase compensating section 158 is constructed by a transfer function C2 ($z^{-1}$)=M·(1−γ)·(1−$z^{-1}$)/(T·(1−γ·$z^{-1}$))) which is obtained by dividing the transfer function C1 (z−1) of low-pass filter 167 by a transfer function P1 of a controlled system.

Figure 20:
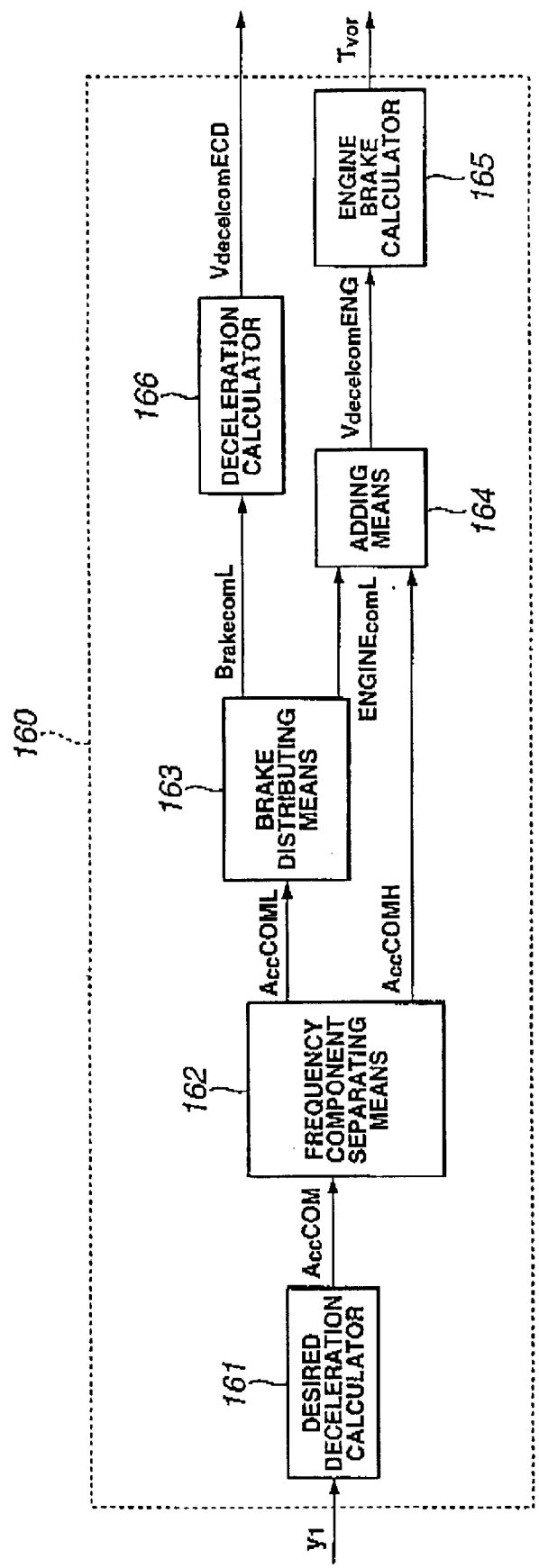
FIG. 20 is a block diagram showing a calculation processing executed by a driving torque distribution control section of FIG. 17.

Subsequently, with reference to a block diagram of FIG. 20, there will be discussed driving torque distribution control section 160. In driving torque distribution control section 160, a desired deceleration calculator 161 calculates a desired deceleration AccCOM by dividing final driving torque command value y1 by average vehicle weight M and by inverting a plus-minus reference of the obtained quotient.

A frequency component separating section 162 divides desired deceleration AccCOMH into a high-frequency component AccCOMH constructed by a small fluctuation component due to the feedback compensation of vehicle speed control section 150 and a low-frequency component AccCOML constructed by the other part. More specifically, high-frequency component AccCOMH is calculated from desired deceleration AccCOM, using a high-pass filter Fhpf (s) represented by the following expression (12).

Fhpf(s)=Thp·s/(Thp·s+1) (12)

Further, low-frequency component AccCOML is calculated by subtracting high-frequency component AccCOMH from desired deceleration AccCOM.

Subsequently, a brake distribution means 163 divides low-frequency component AccCOML of desired deceleration AccCOM into a low-frequency brake deceleration command value BrakecomL to be supplied to brake actuator 109 and a low-frequency engine brake deceleration command value ENGINEcomL to be supplied to the engine brake. This low-frequency engine brake deceleration command value ENGINEcomL is constructed by a small component which cannot be generated by brake actuator 109 due to a resolution performance DIV of brake actuator 109. More specifically, a quotient N is obtained by dividing low-frequency component AccCOML of desired deceleration AccCOM by the resolution performance DIV of brake controller 108. Low-frequency brake deceleration command value BrakecomL is obtained by multiplying the obtained quotient N and resolution performance DIV. Further, low-frequency engine brake deceleration command value ENGINEcomL is obtained by subtracting low-frequency brake deceleration command value BrakecomL from low-frequency component AccCOML.

An adding means 164 obtains an engine brake deceleration command value VdecelcomENG by adding low-frequency engine brake deceleration command value ENGINEcomL to a high-frequency component AccCOMH outputted from a frequency component separating means 162, and outputs the obtained engine brake deceleration command value VdecelcomENG for generating the braking torque via the engine brake.

Figure 21:
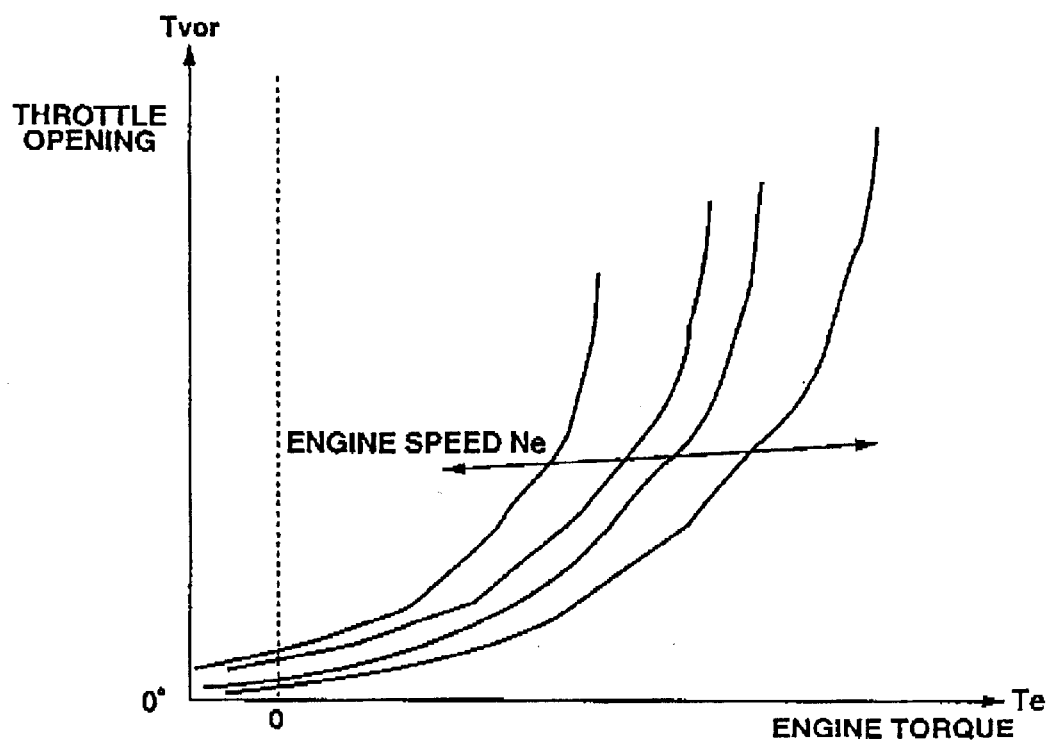
FIG. 21 is a map showing a relationship among an engine speed, an engine torque, and a throttle opening.

An engine brake calculator 165 obtains a desired throttle opening Tvor by retrieving a map shown in FIG. 21 on the basis of an engine torque Te and an engine speed Ne, which are determined according to engine brake deceleration command value VdecelcomENG outputted from adding means 164.

Simultaneously, a deceleration calculator 166 obtains a deceleration command value VdecelcomECD employed for operating brake actuator 109 from low-frequency brake deceleration command value BrakecomL, and outputs the obtained deceleration command value VdecelcomECD. Brake controller 108 is arranged to control brake actuator 109 according to the demanded braking torque. Brake controller 108 may be arranged to control brake actuator 109 according to the demanded deceleration. If brake controller 108 is arranged to control brake actuator 109 according to the demanded deceleration, desired deceleration AccCOM outputted from calculator 161 may be used as deceleration command value VdecelcomECD, or deceleration command value VdecelcomECD may be derived from the following expression (13) which has been obtained taking account of the braking torque due to the engine brake.

VdecelcomECD=AccCOM−(1−Ge(s))VdecelcomENG (13)

where Ge(s) is a transfer function representative of a response of the engine brake.

Subsequently, the manner of operation of the fifth embodiment will be discussed in detail, First, there will be discussed as to a case that the preceding vehicle slightly decelerates during the following control, and final driving torque command value y1 outputted from vehicle speed control section 150 slightly fluctuates due to the feedback compensation. Under this condition, in driving torque distribution control section 160, desired deceleration calculator 161 sets desired deceleration AccCOM at a large value on the basis of final driving torque command value y1. Frequency component separating means 162 distributes a small fluctuation quantity of desired deceleration AccCOM as high-frequency component AccCOMH and the other of desired deceleration AccCOM as low-frequency component AccCOML. Brake distribution means 163 divides low-frequency component AccCOML into low-frequency brake deceleration command value BrakecomL to be distributed to brake actuator 109 and low-frequency engine brake deceleration command value ENGINEcomL to be distributed to the engine brake. The small component of the low-frequency component AccCOML, which cannot be generated by brake actuator 109, is supplied to the engine brake by generating Low-frequency engine brake deceleration command value ENGINEcomL.

Adding means 164 obtains engine brake deceleration command value VdecelcomENG for generating the braking torque via the engine brake by adding high-frequency component AccCOMH outputted from frequency component separating means 162 and low-frequency engine brake deceleration command value ENGINEcomL. Then, adding means 164 outputs the obtained engine brake deceleration command value VdecelcomENG.

Engine brake calculator 165 outputs desired throttle opening Tvor determined on the basis of engine torque Te and engine speed Ne according to engine brake deceleration command value VdecelcomENG as shown in FIG. 22C, and throttle control section 170 outputs throttle command value θ on the basis of the obtained desired throttle opening Tvor.

Simultaneously, deceleration calculator 166 outputs low-frequency brake deceleration command value BrakecomL as deceleration command value VdecelcomECD, as shown in FIG. 22D, and brake control section 180 outputs brake command value $P_B$ on the basis of the obtained deceleration command value VdecelcomECD.

With the thus arranged fifth embodiment according to the present invention, desired deceleration AccCOM is divided into high-frequency component AccCOMH and low-frequency component AccCOML, and the divided high-frequency component AccCOMH and the small component of low-frequency component AccCOML are distributed to the braking torque generated by the engine brake. Accordingly, the engine brake, which has a high resolution performance as compared with that of brake actuator 109, generates the braking torque as shown in FIGS. 22A and 22B. This improves the control performance including the following performance relative to desired deceleration AccCOM.

In contrast to this, if the braking via the engine brake is always executed with a higher priority as shown FIGS. 27A through 27F, the engine brake generates the maximum braking torque according to the large deceleration demanded by desired deceleration AccCOM, as shown in FIGS. 27A and 27C. As a result, the fluctuation of desired deceleration AccCOM due to the feedback compensation is distributed to brake actuator 109 which has a low resolution performance as compared with that of the engine brake. This degrades a responsibility and generates hunting as shown in FIGS. 27S and 27E.

Motor control unit 9 and throttle actuator 112 respectively correspond to driving source braking means. Brake hydraulic pressure control unit 7 and brake actuator 109 respectively correspond to hydraulic pressure braking means. The processing of steps S2 and S4 through S8 and desired deceleration calculator 161 corresponds to desired braking torque calculating means. The processing of step S10 and frequency component separating means 162 and brake distributing means 163 respectively correspond to desired braking torque distributing means. The processing of steps S11 through S13 and frequency component separating means 162 respectively correspond to desired braking torque distributing means. The processing of step S4 corresponds to desired deceleration calculating means. The processing of step S2 corresponds to deceleration detecting means. The processing of steps S5 through S7 corresponds to desired braking torque setting means. Master cylinder pressure sensor corresponds to braking operation detecting means. The operation of step S3 corresponds to maximum braking torque detecting means. Motor control unit 9 corresponds to regenerative braking means. The processing of steps S101 and S201 through S204 corresponds to determination means. The processing of step S301 corresponds to braking operation speed detecting means.

Although the invention has been described above by reference to certain embodiments of the invention, the invention is not limited to the embodiments described above. Modifications and variations of the embodiments described above will occur to those skilled in the art, in light of the above teaching.

Although the first embodiment according to the present invention has been shown and described such that maximum regenerative braking torque Tmmax is divided into high-frequency component regenerative torque limit value TmmaxH and low-frequency component regenerative limit value TmmaxL by a predetermined distribution ratio, the invention may not be limited to this arrangement. For example, a ratio of the absolute value of high-frequency component regenerative torque limit value TmmaxH may be increased according to the decrease of maximum regenerative braking torque Tmmax. By this arrangement, it becomes possible to easily ensure the responsibility of the braking system.

Further, when the ratio of high-frequency component regenerative torque limit value Tmmax is varied according to maximum regenerative braking torque Tmmax, the ratio of high-frequency component regenerative torque limit value TmmaxH may be increased according to the increase of the vehicle speed from the viewpoint that the absolute value of the maximum regenerative braking torque Tmmax decreases according to the increase of the vehicle speed.

Further, when the brake control system according to the present invention is adapted to a vehicle equipped with a management system for managing a state of charge (SOC) of a battery, the absolute value of maximum regenerative braking torque Tmmax may be decreased when SOC is in full charge state upon taking account of a property that it is impossible to execute the regenerative braking when SOC is in the full charge state, so as to increase the ratio of the absolute value of high frequency component regenerative braking torque limit value TmmaxH. A detailed description as to the management system is disclosed in Japanese Patent Provisional Publication No. 2001-268719.

Further, although the second embodiment has been shown and described so as to determine that the depression state of brake pedal 1 is in the transient state until predetermined time Tconv1 elapses from a moment when brake pedal switch 12 detects the depression of brake pedal 1, the invention may not be limited to this. For example, it may be arranged to determine that the depression state is in the transient state until the predetermined time Tconve1 elapses from a moment when the change of a stroke of brake pedal 1 is detected.

This application is based on Japanese Patent Applications No. 2002-279317 filed on Sep. 25, 2002, No. 2002-221990 filed on Jul. 30, 2002, and No. 2002-6496 filed on Jan. 15, 2002 in Japan. The entire contents of these Japanese Patent Applications are incorporated herein by reference.

The scope of the invention is defined with reference to the following claims.

What is claimed is:

1. A brake control system for a vehicle equipped with a hydraulic brake device and a driving source for driving the vehicle, the brake control system comprising:
   a controller configured,
   to divide a desired braking torque into a low-frequency component and a high-frequency component;
   to command the driving source to generate the high-frequency component; and
   to command at least one of the hydraulic brake device and the driving source to generate the low-frequency component.

2. A brake control system for a vehicle, comprising:
   a first braking device that generates a braking torque by operating a driving source of the vehicle;
   a second braking device that generates the braking torque by operating a hydraulic brake system of the vehicle; and
   a controller connected to the first braking device and a second braking device, the controller being configured,
   to calculate a desired braking torque,
   to divide the desired braking torque into a low-frequency component and a high-frequency component,
   to command the first braking device to generate the high-frequency component,
   to command at least one of the first braking device and the second braking device to generate the low-frequency component.

3. The brake control system as claimed in claim 2, wherein the controller is further configured to calculate a desired deceleration according to a vehicle condition, to detect an actual deceleration of the vehicle, and to set the desired braking torque by calculating a braking torque for bringing the actual deceleration closer to the desired deceleration.

4. The brake control system as claimed in claim 3, further comprising a braking operation detecting device that detects a braking operation of a driver, the controller being configured to calculate the desired deceleration on the basis of the braking, operation.

5. The brake control system as claimed in claim 2, further comprising a maximum braking torque detecting device that detects a maximum braking torque which is capable of being generated by the first braking device, the controller being configured to set a distribution quantity of the braking torque of the first braking device so that a ratio of the absolute value of the low-frequency component relative to the absolute value of the maximum braking torque decreases as the absolute value of the maximum braking torque decreases.

6. The brake control system as claimed in claim 5, further comprising a vehicle speed detecting device that detects a vehicle speed of the vehicle, the controller being configured to detect the maximum braking torque on the basis of the vehicle speed.

7. The brake control system as claimed in claim 5, further comprising a battery charge state detecting device that detects a state of charge (SOC) of a battery connected to a vehicle for driving the vehicle, the first braking device including a regenerative braking device which generates the braking torque by operating the motor as a generator, the controller being configured to detect the maximum braking torque on the basis of the SOC.

8. The brake control system as claimed in claim 2, wherein the first braking device includes an engine system which is capable of generating the braking torque by generating an engine brake of an internal combustion engine.

9. The brake control system as claimed in claim 2, wherein the first braking device includes a motor/generator system which is capable of generating the braking torque by operating a motor/generator as a generator.

10. The brake control system as claimed in claim 4, wherein the controller is configured to determine whether a state of the braking operation detected by the braking operation detecting device is in a transient state or in a steady state, the first braking device including a motor/generator system which is capable of generating the braking torque by generating a motor/generator as a generator,
    wherein the controller is configured to decrease a distribution quantity of an absolute value of the low-frequency component to be generated by the first braking device when the state of the braking operation is in the transient state, and to increase the distribution quantity of the absolute value of the low-frequency component to be generated by the first braking device when the state of the braking operation is in the steady state.

11. The brake control system as claimed in claim 10, wherein the controller is configured to determine that the state of the braking operation is in the transient state until a predetermined time period elapses from a moment when the braking operation detecting device detects a predetermined braking operation, and to determine that the state of the braking operation is in the steady state after a predetermined time period elapses from a moment when the braking operation detecting device detects a predetermined braking operation.

12. The brake control system as claimed in claim 10, wherein the controller is configured to determine that the state of the braking operation is in the steady state when a condition that an absolute value of the high-frequency component is smaller than a predetermined value is maintained for a second predetermined time period.

13. The brake control system as claimed in claim 2, further comprising a braking operation speed detecting device that detects an operating speed of the braking operation, the first braking device including a regenerative braking device that generates the braking torque by operating a motor/generator as a generator.
    wherein the controller is configured to decrease the distribution quantity of an absolute value of the low-frequency component to be generated by the first braking device when an absolute value of the operating speed of the braking operation is greater than a predetermined speed, and to increase the distribution quantity of the absolute value of the low-frequency component to be generated by the first braking device when an absolute value of the operating speed of the braking operation is smaller than or equal to the predetermined speed.

14. The brake control system as claimed in claim 2, wherein the controller is configured to divide frequency components of the desired braking torque at a predetermined frequency into the low-frequency component and a high-frequency component.

15. The brake control system as claimed in claim 2, wherein the controller comprises a first brake controller for controlling the first braking device, a second brake controller for controlling the second braking device and a coordination controller for commanding the first and second brake controllers to generate the desired braking torque.

16. A brake control system for a vehicle, comprising:

a braking operation detector that detects a braking operation of a driver of the vehicle;

a first braking device that generates a braking torque by operating a driving source of the vehicle;

a second braking device that generates the braking torque by operating a hydraulic brake system of the vehicle, the second braking device being lower in responsibility and resolution than the first braking device; and a controller connected to the brake operation detector, the first braking device and a second braking device, the controller being configured, to calculate the desired deceleration on the basis of the braking operation, to calculate a desired braking torque, to divide frequency components of the desired braking torque at a predetermined frequency into a low-frequency component group and a high-frequency component group, to command the first braking device to generate a braking torque corresponding to the high-frequency component group of the desired braking torque, to command at least one of the first braking device and the second braking device to generate a braking torque corresponding to the low-frequency component group of the desired braking torque.

17. A method of controlling a brake control system for a vehicle equipped with a hydraulic brake device and a driving source for driving the vehicle, the brake control comprising:

dividing a desired braking torque into a low-frequency component and a high-frequency component;

distributing the high-frequency component to the driving source to generate a braking torque corresponding to the high-frequency component; and distributing the low-frequency component to at least one of the hydraulic pressure brake device and the driving source to generating a braking torque corresponding to the low-frequency component.

18. A brake control system for a vehicle equipped with a hydraulic brake device and a driving source for driving the vehicle, the brake control comprising:

dividing means for dividing a desired braking torque into a low-frequency component and a high-frequency component;

a first distributing means for distributing the high-frequency component to the driving source so as to generate a braking torque corresponding to the high-frequency component; and second distributing means for distributing the low-frequency component to at least one of the hydraulic pressure brake device and the driving source to generate a braking torque corresponding to the low frequency component.

* * * * *